United States Patent
Hannuksela

(10) Patent No.: US 10,609,407 B2
(45) Date of Patent: Mar. 31, 2020

(54) METHOD AND APPARATUS FOR VIDEO CODING

(71) Applicant: Nokia Technologies Oy, Espoo (FI)

(72) Inventor: Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/325,615

(22) Filed: Jul. 8, 2014

(65) Prior Publication Data

US 2015/0016531 A1   Jan. 15, 2015

Related U.S. Application Data

(60) Provisional application No. 61/843,996, filed on Jul. 9, 2013.

(51) Int. Cl.

| | |
|---|---|
| *H04N 19/51* | (2014.01) |
| *H04N 19/52* | (2014.01) |
| *H04N 19/46* | (2014.01) |
| *H04N 19/31* | (2014.01) |
| *H04N 19/59* | (2014.01) |
| *H04N 19/33* | (2014.01) |
| *H04N 19/70* | (2014.01) |

(52) U.S. Cl.
CPC .............. *H04N 19/52* (2014.11); *H04N 19/31* (2014.11); *H04N 19/33* (2014.11); *H04N 19/46* (2014.11); *H04N 19/59* (2014.11); *H04N 19/70* (2014.11)

(58) Field of Classification Search
CPC ......... H04N 19/52; H04N 19/70; H04N 19/31
See application file for complete search history.

(56) References Cited

U.S. PATENT DOCUMENTS

| | | | |
|---|---|---|---|
| 2011/0013697 A1* | 1/2011 | Choi ................... | H04N 19/105 375/240.16 |
| 2012/0183076 A1* | 7/2012 | Boyce ................. | H04N 19/105 375/240.25 |

(Continued)

FOREIGN PATENT DOCUMENTS

| | | |
|---|---|---|
| CN | 102474619 | 5/2012 |
| WO | WO 2012/116212 A1 | 8/2012 |

OTHER PUBLICATIONS

Lin et al., "On Collocated Picture and Low-Delay Checking for SHVC ref_idx Framework", Joint Collaborative Team on Video Coding (JCT-VC) of ITU-T SG 16 WP 3 and ISO/IEC JTC 1/SC 29/WG 11, Document: JCT3V-M0065, 13th Meeting, Apr. 18-26, 2013, pp. 1-4.

(Continued)

*Primary Examiner* — Zhubing Ren
(74) *Attorney, Agent, or Firm* — Alston & Bird LLP

(57) ABSTRACT

There are disclosed various methods, apparatuses and computer program products for video encoding and decoding. In some embodiments a method comprises at least one of the following: encoding into a bitstream an indication that motion fields are stored, but only for inter-layer motion prediction; encoding into a bitstream an indication on a limited scope of motion field usage; encoding into a bitstream an indication whether or not to use the motion field for prediction; encoding into a bitstream an indication of storage parameters for storing motion information.

19 Claims, 4 Drawing Sheets

(56) References Cited

U.S. PATENT DOCUMENTS

| | | | | |
|---|---|---|---|---|
| 2013/0208792 A1* | 8/2013 | He | ............ | H04N 19/00569 |
| | | | | 375/240.12 |
| 2013/0322531 A1* | 12/2013 | Chen | ............ | H04N 19/00569 |
| | | | | 375/240.12 |

OTHER PUBLICATIONS

"Advanced Video Coding for Generic Audiovisual Services", Series H: Audiovisual and Multimedia Systems, Infrastructure of audiovisual services—Coding of moving video, Recommendation ITU-T H.264, Mar. 2010, 676 pages.

"High Efficiency Video Coding", Series H: Audiovisual and Multimedia Systems, Infrastructure of audiovisual services—Coding of moving video, Recommendation ITU-T H.265, Apr. 2013, 317 pages.

Chen et al., "Temporal Motion Vector Prediction Hook for Efficient Merge Mode in MV-HEVC", Joint Collaborative Team on Video Coding (JCT-VC) of ITU-T SG 16 WP 3 and ISO/IEC JTC 1/SC 29/WG 11, Document: JCTVC-L0257, 12th Meeting, Jan. 14-23, 2013, pp. 1-12.

Chen et al., "Temporal Motion Vector Prediction Hook for MV-HEVC", Joint Collaborative Team on Video Coding (JCT-VC) of ITU-T SG 16 WP 3 and ISO/IEC JTC 1/SC 29/WG 11, Document: JCTVC-K0239, 11th Meeting, Oct. 10-19, 2012, pp. 1-8.

"Hook on Temporal Motion Vector Prediction for M-HEVC", Joint Collaborative Team on Video Coding (JCT-VC) of ITU-T SG 16 WP 3 and ISO/IEC JTC 1/SC 29/WG 11, Document: JCTVC-L0177, 12th Meeting, Jan. 14-23, 2013, pp. 1-5.

"Parameter Values for Ultra-High Definition Television Systems for Production and International Programme Exchange", Recommendation ITU-R BT.2020, Aug. 2012, 7 pages.

"Parameter Values for the HDTV Standards for Production and International Programme Exchange", Recommendation ITU-R BT.709-5, Apr. 2002, 32 pages.

Lee et al., "On Signaling the Syntax sps_inter_layer_mfm_enable_flag", Joint Collaborative Team on Video Coding (JCT-VC) of ITU-T SG 16 WP 3 and ISO/IEC JTC 1/SC 29/WG 11, Document: JCTVC-M0120_r2, 13th Meeting, Apr. 18-26, 2013, pp. 1-4.

Helle et al., "A Scalable Video Coding Extension of HEVC", Data Compression Conference (DCC), Mar. 20-22, 2013, pp. 201-210.

Schwarz et al., "Overview of the Scalable Video Coding Extension of the H.264/AVC Standard", IEEE Transactions on Circuits and Systems for Video Technology, vol. 17, Issue: 9, Sep. 2007, pp. 1103-1120.

International Search Report and Written Opinion received for corresponding Patent Cooperation Treaty Application No. PCT/IB2014/062953, dated Oct. 23, 2014, 14 pages.

Office Action from corresponding Korean Patent Application No. 2016-7003400, dated Feb. 23, 2017.

Deng Z et al: "SCE5.1.7: Inter-layer motion data inheritance", 104. MPEG Meeting, Apr. 22, 2013-Apr. 26, 2013; Incheon; (Motion Picture Expert Group or ISO/IEC JTC1/SC29/WG11,, No. m28495, Apr. 16, 2013 (Apr. 16, 2013), XP030057029.

Extended European Search Report from corresponding European Patent Application No. 14822747.3 dated Feb. 28, 2017.

Hannuksela (Nokia) M M: "MV-HEVC/SHVC HLS: on storage of motion fields", 14. JCT-VC Meeting; Jul. 25, 2013-Aug. 2, 2013; Vienna; (Joing Collaborative Team on Video Coding of ISO/IEC JTC1/SC29/WG11 and ITU-T SG.16); URL: http://wftp3.itu.in/av-arch/jctvc-site/,, No. JCTVC-N0064-v3, Jul. 29, 2013 (Jul. 29, 2013), XP030114500.

Office Action from corresponding Chinese Patent Application No. 201480049119.6, dated Jan. 2, 2018 with English Translation, 10 pages.

Office Action from corresponding Korean Patent Application No. 2016-7003400, dated Oct. 26, 2017, 8 pages.

Office Action from corresponding Chinese Patent Application No. 201480049119.6, dated Dec. 3, 2018 with English Summary, 8 pages.

Office Action for European Application No. 14 822 747.3 dated Sep. 30, 2019, 5 pages.

Chen. J. et al., *Scalable Video Coding Extension for HEVC*, Data Compression Conference (DCC) Mar. 20, 2013 IEEE (2013) pp. 191-200.

* cited by examiner

METHOD AND APPARATUS FOR VIDEO CODING

TECHNICAL FIELD

The present application relates generally to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoded that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such, wherein only a limited number of input views, e.g. a mono or a stereo video plus some supplementary data, is provided to a decoder side and all required views are then rendered (i.e. synthesized) locally by the decoder to be displayed on a display.

Some video coding standards introduce headers at slice layer and below, and a concept of a parameter set at layers above the slice layer. An instance of a parameter set may include all picture, group of pictures (GOP), and sequence level data such as picture size, display window, optional coding modes employed, macroblock allocation map, and others. Each parameter set instance may include a unique identifier. Each slice header may include a reference to a parameter set identifier, and the parameter values of the referred parameter set may be used when decoding the slice. Parameter sets decouple the transmission and decoding order of infrequently changing picture, GOP, and sequence level data from sequence, GOP, and picture boundaries. Parameter sets can be transmitted out-of-band using a reliable transmission protocol as long as they are decoded before they are referred. If parameter sets are transmitted in-band, they can be repeated multiple times to improve error resilience compared to conventional video coding schemes. The parameter sets may be transmitted at a session set-up time. However, in some systems, mainly broadcast ones, reliable out-of-band transmission of parameter sets may not be feasible, but rather parameter sets are conveyed in-band in Parameter Set NAL units.

SUMMARY

Some embodiments provide a method for encoding and decoding video information. In some embodiments of the present invention there is provided a method, apparatus and computer program product for video coding.

Various aspects of examples of the invention are provided in the detailed description.

According to a first aspect, there is provided a method comprising at least the following: encoding into a bitstream an indication indicating whether motion fields of a layer are stored, wherein the motion fields are only for inter-layer motion prediction According to a second aspect, there is provided a method comprising at least one of the following:
a) encoding into a bitstream an indication that motion fields are stored, but only for inter-layer motion prediction;
b) encoding into a bitstream an indication on a limited scope of motion field usage;
c) encoding into a bitstream an indication whether or not to use the motion field for prediction;
d) encoding into a bitstream an indication of storage parameters for storing motion information.

According to a third aspect, there is provided an apparatus comprising at least one processor and at least one memory including computer program code, the at least one memory and the computer program code configured to, with the at least one processor, cause the apparatus to perform at least the following: encode into a bitstream an indication indicating whether motion fields of a layer are stored, wherein the motion fields are only for inter-layer motion prediction According to a fourth aspect, there is provided an apparatus comprising at least one processor and at least one memory including computer program code, the at least one memory and the computer program code configured to, with the at least one processor, cause the apparatus to perform at least one of the following:
a) encode into a bitstream an indication that motion fields are stored, but only for inter-layer motion prediction;
b) encode into a bitstream an indication on a limited scope of motion field usage;
c) encode into a bitstream an indication whether or not to use the motion field for prediction;
d) encode into a bitstream an indication of storage parameters for storing motion information.

According to a fifth aspect, there is provided an encoder comprising at least one processor and at least one memory including computer program code, the at least one memory and the computer program code configured to, with the at least one processor, cause the encoder to perform at least the following: encode an indication into a bitstream for a decoder, said indication indicating whether motion fields of a layer are stored; wherein the motion fields are only for inter-layer motion prediction.

According to a sixth aspect, there is provided a computer program product including one or more sequences of one or more instructions which, when executed by one or more processors, cause an apparatus to at least perform at least the following: encoding an indication into a bitstream for a decoder, said indication indicating whether motion fields of a layer are stored; wherein the motion fields are only for inter-layer motion prediction.

According to a seventh aspect there is provided a computer program product including one or more sequences of one or more instructions which, when executed by one or more processors, cause an apparatus to at least perform at least one of the following:
a) encoding into a bitstream an indication that motion fields are stored, but only for inter-layer motion prediction;
b) encoding into a bitstream an indication on a limited scope of motion field usage;

c) encoding into a bitstream an indication whether or not to use the motion field for prediction;

d) encoding into a bitstream an indication of storage parameters for storing motion information.

According to an eighth aspect, there is provided a method at least the following: decoding an indication from a bitstream, said indication indicating whether motion fields of a layer are stored; wherein the motion fields are only for inter-layer motion prediction.

According to a ninth aspect, there is provided a method comprising at least one of the following:

a) decoding from a bitstream an indication that motion fields are stored, but only for inter-layer motion prediction;

b) decoding from a bitstream an indication on a limited scope of motion field usage;

c) decoding from a bitstream an indication whether or not to use the motion field for prediction;

d) decoding from a bitstream an indication of storage parameters for storing motion information.

According to a tenth aspect, there is provided an apparatus comprising at least one processor and at least one memory including computer program code, the at least one memory and the computer program code configured to, with the at least one processor, cause the apparatus to perform at least the following: decoding an indication from a bitstream, said indication indicating whether motion fields of a layer are stored; wherein the motion fields are only for inter-layer motion prediction.

According to a eleventh aspect, there is provided an apparatus comprising at least one processor and at least one memory including computer program code, the at least one memory and the computer program code configured to, with the at least one processor, cause the apparatus to perform at least one of the following:

a) decode from a bitstream an indication that motion fields are stored, but only for inter-layer motion prediction;

b) decode from a bitstream an indication on a limited scope of motion field usage;

c) decode from a bitstream an indication whether or not to use the motion field for prediction;

d) decode from a bitstream an indication of storage parameters for storing motion information.

According to twelfth aspect, there is provided a computer program product including one or more sequences of one or more instructions which, when executed by one or more processors, cause an apparatus to at least perform at least the following: decoding an indication from a bitstream, said indication indicating whether motion fields of a layer are stored; wherein the motion fields are only for inter-layer motion prediction.

According to a thirteenth aspect there is provided a computer program product including one or more sequences of one or more instructions which, when executed by one or more processors, cause an apparatus to at least perform at least one of the following:

a) decoding from a bitstream an indication that motion fields are stored, but only for inter-layer motion prediction;

b) decoding from a bitstream an indication on a limited scope of motion field usage;

c) decoding from a bitstream an indication whether or not to use the motion field for prediction;

d) decoding from a bitstream an indication of storage parameters for storing motion information.

According to an embodiment, a step a) comprises two or more of the following:

i. encoding into/decoding from a bitstream an indication whether or not motion fields are used within a layer for temporal motion vector prediction;

ii. encoding into/decoding from a bitstream an indication whether or not inter-layer motion prediction is allowed to be used;

iii. encoding into/decoding from a bitstream an indication whether or not diagonal motion prediction is allowed to be used.

According to an embodiment, in step b) the limited scope defines either certain temporal sub-layers or picture types or both.

According to an embodiment, step c) comprises using a specific algorithms for inferring motion fields to be used for prediction.

According to an embodiment, step c) comprises encoding into/decoding from the bitstream a command or a syntax element for controlling motion field marking.

According to an embodiment, step d) comprises indicating either spatial resolution or accuracy of storing motion information.

According to an embodiment, step d) comprises indicating which parameters of the motion information are needed in the motion prediction.

According to an embodiments, step d) comprises indicating constraints on parameter of the motion information which reduces the storage space for motion fields.

According to an embodiment the indication is specified in a sequence parameter set.

According to an embodiment, the motion fields are stored as part of an encoding a current picture at a certain layer.

According to an embodiment, the apparatus is a mobile device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 2:
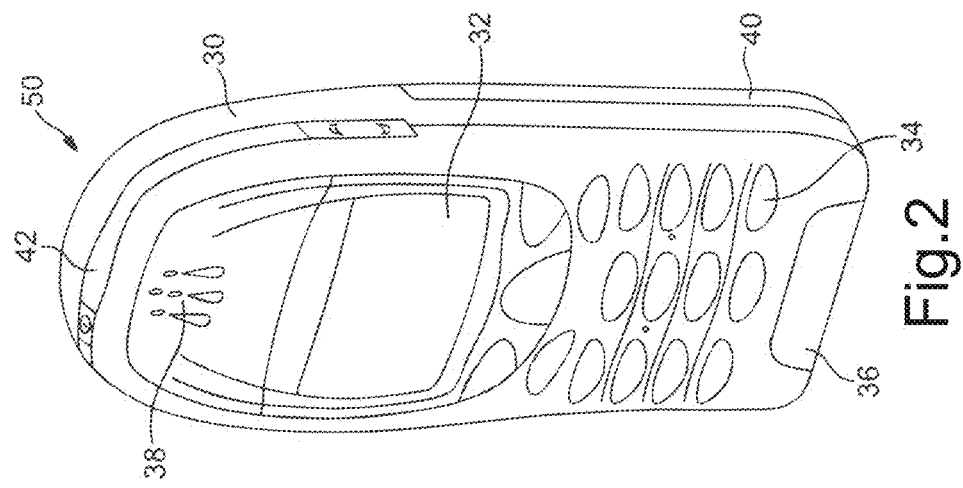
FIG. 2 shows an apparatus for video coding according to an embodiment.

In the following, several embodiments of the invention will be described in the context of one video coding arrangement. It is to be noted, however, that the invention is not limited to this particular arrangement. In fact, the different embodiments have applications widely in any environment where improvement of non-scalable, scalable and/or multi-view video coding is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

The H.265/HEVC standard was developed by the Joint Collaborative Team on Video Coding (JCT-VC) of VCEG and MPEG. The H.265/HEVC standard will be published by both parent standardization organizations, and is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer pictures similarly to the decoded reference pictures of the enhancement layer. Consequently, the encoder may choose a base-layer reference picture as inter prediction reference and may indicate its use e.g. with a reference picture index in the coded bitstream. The decoder decodes from the bitstream, for example from a reference picture index, that a base-layer picture is used as an inter prediction reference for the enhancement layer. When a decoded base-layer picture is used as a prediction reference for an enhancement layer, it is referred to as an inter-layer reference picture.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of views, e.g. a mono or a stereo video plus some supplementary data, is provided to a decoder side and all required views are then rendered (i.e. synthesized) locally be the decoder to be displayed on a display.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

When describing H.264/AVC and HEVC as well as in example embodiments, common notation for arithmetic operators, logical operators, relation operators, bit-wise operators, assignment operators, and range notation e.g. as specified in H.264/AVC or a draft HEVC may be sued. Furthermore, common mathematical functions e.g. as specified in H.264/AVC or a draft HEVC may be used and a common order or precedence and execution order (from left to right or from right to left) of operators e.g. a specified in H.264/AVC or a draft HEVC may be used.

When describing H.264/AVC and HEVC as well as in example embodiments, the following description may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.

ue(v): unsigned integer Exp-Golomb-coded syntax element with the left bit first.

An Exp-Golomb bit string may be converted to a code number (codeNum) for example using the following table:

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

A code number corresponding to an Exp-Golomb bit string may be converted to se(v) for example using the following table:

| codeNum | syntax element value |
| --- | --- |
| 0 | 0 |
| 1 | 1 |
| 2 | −1 |
| 3 | 2 |
| 4 | −2 |
| 5 | 3 |
| 6 | −3 |
| . . . | . . . |

When describing H.264/AVC and HEVC as well as in example embodiments, syntax structures, semantics of syntax elements, and decoding process may be specified as follows. Syntax elements in the bitstream are represented in bold type. Each syntax elements is described by its name (all lower case letters with underscore characteristics), optionally its one or two syntax categories, and one or two descriptors for its method of coded representation. The decoding process behaves according to the value of the syntax element and to the values of previously decoded syntax elements. When a value of a syntax element is used in the syntax tables or the text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing H.264/AVC and HEVC as well as in example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoded conformance can be verified with the Hypothetical Reference Decoder losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture may either be a frame or a field. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In a draft HEVC standard, video pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as CTU (coding tree unit) and the video picture is divided into non-overlapping CTUs. An CTU can be further split into a combination of smaller CUs, e.g. by recursively splitting the CTU and resultant CUs. Each resulting CU typically has at least one PU and at least on TU associated with it. Each PU and TU can further be split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signaled in the bitstream allowing the decoder to reproduce the intended structure of these units In a draft HEVC standard, a picture can be partitioned in tiles, which are rectangular and contain an integer number of CTUs. In the current working draft of HEVC, the partitioning to tiles forms a regular grid, where heights and widths of tiles differ from each other by one CTU at the maximum. In a draft HEVC, a slice consists of an integer number of CUs. The CUs are scanned in the raster scan order of CTUs within tiles or within a picture, if tiles are not in use. Within an CTU, the CUs have a specific scan order.

In a Working Draft (WD) 5 of HEVC, some key definitions and concepts for picture partitioning are defined as follows. A partitioning is defined as the division of a set into subsets such that each element of the set is in exactly one of the subsets.

A basic coding unit in a HEVC WD5 is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two tress, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprises treeblocks contained in several tiles.

In H.264/AVC and HEVC, in-picture prediction may be disabled across slice boundaries. Thus, slices can be regarded as a way to split a coded picture into independently decodable pieces, and slices are therefore of the regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

The elementary unit for the output of an H.264/AVC or HEVC encoder and the input of an H.264/AVC or HEVC decoder respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false dection of NAL unit boundaries, encoders may run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not.

NAL units consist of a header and payload. In H.264/AVC, the NAL unit header indicates the type of the NAL unit and whether a coded slice contained in the NAL unit is a part of a reference picture or a non-reference picture. H.264/AVC includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may be additionally contain various indications related to scalability and multiview hierarchy.

In HEVC, a two-byte NAL unit header is used for all specified NAL unit types. The NAL unit header contains one reserved bit, a six-bit NAL unit type indication, a six-bit reserved field (called nuh_layer_id) and a three-bit temporal_id_plus 1 indication for temporal level. The temporal_id_plus 1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. Without loss of generality, in some example embodiments a variable LayerId is derived from the value of nuh_layer_id for example as follows: LayerId=nuh_layer_id. In the following, LayerId, nuh_layer_id and layer_id are used interchangeably unless otherwise indicated.

It is expected that nuh_layer_id and/or similar syntax elements in NAL unit header would carry information on the scalability hierarchy. For example, the LayerId value may be mapped to values of variables or syntax elements describing different scalability dimensions, such as quality_id or similar, dependency_id or similar, any other type of layer identifier, view order index or similar, view identifier, an indication whether the NAL unit concerns depth or texture i.e. depth_flag or similar, or an identifier similar to priority_id of SVC indicating a valid sub-bitstream extraction if all NAL units greater than a specific identifier value are removed from the bitstream. nuh_layer_id and/or similar syntax elements may be partitioned into one or more syntax elements indicating scalability properties. For example, a certain number of bits among nuh_layer_id and/or similar syntax elements may be used for dependency_id or similar, while another certain number of bits among nuh_layer_id and/or similar syntax elements may be used for quality_id or similar. Alternatively, a mapping of LayerId values or similar to values of variables or syntax elements describing different scalability dimensions may be provided for example in a Video Parameter Set, a Sequence Parameter Set or another syntax structure.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In a draft HEVC standard, a coded slice NAL unit can be indicated to be one of the following types:

| nal_unit_ type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17 | BLA_W_LP BLA_W_DLP | Coded slice segment of a BLA picture slice_segment_layer_rbsp( ) |
| 18 | BLA_N_LP | |
| 19, 20 | IDR_W_DLP IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_RAP_VCL22.. RSV_RAP_VCL23 | Reserved // reserved RAP VCL NAL unit types |
| 24..31 | RSV_VCL24.. RSV_VCL31 | Reserved // reserved non-RAP VCL NAL unit types |

In a draft HEVC standard, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also or alternatively be referred to as intra random access point (IRAP) picture, is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture may either be a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some earlier drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

Decodable leading pictures may be such that can be correctly decoded when the decoding is started from the CRA picture. In other words, decodable leading pictures use only the initial CRA picture or subsequent pictures in decoding order as reference in inter prediction. Non-decodable leading pictures are such that cannot be correctly decoded when the decoding is started from the initial CRA picture. In other words, non-decodable leading pictures use pictures prior, in decoding order, to the initial CRA picture as references in inter prediction.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream.

When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. BLA_W_DLP may also be referred to as BLA_W_RADL. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_DLP does not have associated RASL pictures present in the bitstream, but may have associated RADL pictures in the bitstream. IDR_W_DLP may also be referred to as IDR_W_RADL.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in a draft HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC, there are two picture types, the TSA and STSA picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimeter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set (SPS). In addition to the parameters that may be essential to the decoding process, the sequence parameter set may optionally contain video usability information (VUI), which includes parameters that may be important for buffering, picture output timing, rendering and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. A picture parameter set (PPS) contains such parameters that are likely to be unchanged in several coded pictures.

Parameter set syntax structures may have extensions mechanisms, which may for example be used to include parameters that are specific to extensions of a coding standard. An example syntax of an extension mechanism is provided in the following for SPS:

|  | Descriptor |
|---|---|
| seq_parameter_set_rbsp( ) { | |
| ... | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

Decoders of particular version(s) of a coding standard or a coding scheme may ignore sps_extension_data_flag, while in another version of the coding standard or the coding scheme, an extension syntax structure may be specified and may appear within the sps_extension_data_flag bits. Similar extensions mechanisms may be specifies also for other types of parameter sets.

In a draft HEVC, there is also a third type of parameter sets, here referred to as Adaptation Parameter Set (APS), which includes parameters that are likely to be unchanged in several coded slices. In a draft HEVC, the APS syntax structure includes parameters or syntax elements related to context-based adaptive binary arithmetic coding (CABAC), adaptive sample offset, adaptive loop filtering, and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS. However, APS was not included in the final H.265/HEVC standard.

H.265/HEVC also includes another type of a parameter set, called a video parameter set (VPS). A video parameter set RBSP may include parameters that can be referred to by one or more sequence parameter set RBSPs.

The relationship and hierarchy between VPS, SPS, and PPS may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain TemporalId values) of a layer representation. VPS may also provide the maximum number of layers present in the bitstream. For example, the syntax element vps_max_layers_minus1 may be included in the syntax and vps_max_layer_minus1+1 may indicate the maximum number of layers present in the bitstream. The actual number of layers in the bitstream may be smaller than or equal to vps_max_layer_minus1+1.

An example syntax of a VPS extension intended to be a part of the VPS is provided in the following. The presented VPS extension provides the dependency relationships among other things. It should be understood that the VPS extension syntax is provided as an example and other similar and/or extended syntax structures may be equivalently applied with different embodiments.

| | Descriptor |
|---|---|
| vps_extension( ) { | |
|   while( !byte_aligned( ) ) | |
|     vps_extension_byte_alignment_reserved_one_bit | u(1) |
|   for( i = 0, NumScalabilityTypes = 0; i < 16; i++) { | |
|     scalability_mask[ i ] | u(1) |
|     NumScalabilityTypes += scalability_mask[ i ] | |
|   } | |
|   for( j = 0; j < NumScalabilityTypes; j++) | |
|     dimension_id_len_minus1[ j ] | u(3) |
|   vps_nuh_layer_id_present_flag | u(1) |
|   for( i = 0; i <= vps_max_layers_minus1; i++) { | |
|     if( vps_nuh_layer_id_present_flag && i > 0 ) | |
|       layer_id_in_nuh[ i ] | u(6) |
|     for( j = 0; j < NumScalabilityTypes; j++ ) | |
|       dimension_id[ i ][ j ] | u(v) |
|   } | |
|   for( i = 1; i <= vps_max_layers_minus1; i++) | |
|     for( j = 0; j < i; j++) | |
|       direct_dependency_flag[ i ][ j ] | u(1) |
|   direct_dep_type_len_minus2 | ue(v) |
|   for( i =1; i <= vps_max_layers_minus1; i++) | |
|     for( j = 0; j < i; j++) | |
|       if( direct_dependency_flag[ i ][ j ]) | |
|         direct_dependency_type [ i ][ j ] | u(v) |
| } | |

The semantics of the presented VPS extension may be specified as described in the following paragraphs.

vps_extension_byte_alignment_reserved_one_bit is equal to 1 and is used to achieve alignment of the next syntax element to a byte boundary.

scalability_mask[i] equal to 1 indicates that dimension_id syntax elements corresponding to the i-th scalability dimension are present. scalability_mask[i] equal to 0 indicates that dimension_id syntax elements corresponding to the i-th scalability dimension are not present. The scalability dimensions corresponding to each value of i in scalability_mask[i] may be specified for example to include the following or any subset thereof along with other scalability dimensions.

| scalability_mask index | Scalability dimension | ScalabilityId mapping |
|---|---|---|
| 0 | multiview | ViewId |
| 1 | spatial or quality scalability | DependencyId | dimension_id_len_minus1 [j] plus 1 specifies the length, in bits, of the dimension_id[i][j] syntax element. vps_nuh_layer_id_present_flag specifies whether the layer_id_in_nuh[i] syntax is present. layer_id_in_nuh[i] specifies the value of the nuh_layer_id syntax element in VCL NAL units of the i-th layer. When not present, the value of layer_id_in_nuh[i] is inferred to be equal to i. layer_id_in_nuh[i] is greater than layer_id_in_nuh[i−1]. The variable LayerIdxInVps[layer_id_in_nuh[i]] is set equal to i. dimension_id[i][j] specifies the identifier of the j-th scalability dimension type of the i-th layer. When not present, the value of dimension_id[i][j] is inferred to be equal to 0. The number of bits used for the representation of dimension_id[i][j] is dimension_id_len_minus1[j]+1 bits.

direct_dependency_flag[i][j] equal to 0 specifies that the layer with index j is not a direct reference layer for the layer with index i. direct_dependency_flag[i][j] equal to 1 specifies that the layer with index j may be a direct reference layer for the layer with index i. When direct_dependency_flag[i][j] is not present for i and j in the range of 0 to vps_max_num_layers_minus1, it is inferred to be equal to 0.

The variables NumDirectRefLayers[i] and RefLayerId[i][j] may be derived as follows:

```
for( i = 1; i <= vps_max_layers_minus1; i++ )
  for( j = 0, NumDirectRefLayers[ i ] = 0; j < i; j++ )
    if( direct_dependency_flag[ i ][ j ] == 1 )
      RefLayerId[ i ][ NumDirectRefLayers[ i ]++ ] = layer_id_in_nuh[ j ]
``` direct_dep_type_len_minus2 plus 2 specifies the number of bits of the direct_dependency_type[i][j] syntax element. direct_dependency_type[i][j] equal to 0 indicates that sample prediction may be used and motion prediction is not used for layer identified by i from layer identified by j. direct_dependency_type[i] [j] equal to 1 indicates that motion prediction may be used and sample prediction is not used for layer identified by i from layer identified by j. direct_dependency_type[i][j] equal to 2 indicates that both sample and motion prediction may be used for layer identified by i from layer identified by j.

The variables NumSamplePredRefLayers[i], NumMotionPredRefLayers[i], SamplePredEnabledFlag[i][j], MotionPredEnabledFlag[i][j], NumDirectRefLayers[i], RefLayerId[i][j], MotionPredRefLayerId[i][j], and SamplePredRefLayerId[i][j] may be derived as follows:

```
for( i = 0; i < 64; i++ ) {
    NumSamplePredRefLayers[ i ] = 0
    NumMotionPredRefLayers[ i ] = 0
    NumDirectRefLayers[ i ] = 0
    for( j = 0; j < 64; j++ ) {
        SamplePredEnabledFlag[ i ][ j ] = 0
        MotionPredEnabledFlag[ i ][ j ] = 0
        RefLayerId[ i ][ j ] = 0
        SamplePredRefLayerId[ i ][ j ] = 0
        MotionPredRefLayerId[ i ][ j ] = 0
    }
}
for( i = 1; i <= vps_max_layers_minus1; i++ ) {
    iNuhLId = layer_id_in_nuh[ i ]
    for( j = 0; j < i; j++ )
        if( direct_dependency_flag[ i ][ j ] ) {
            RefLayerId[ iNuhLId ][ NumDirectRefLayers[ iNuhLId ]++ ] = layer_id_in_nuh[ j ]
            SamplePredEnabledFlag[ iNuhLId ][ j ] = ( ( direct_dependency_type[ i ][ j ] + 1 ) &
1 )
            NumSamplePredRefLayers[ iNuhLId ] += SamplePredEnabledFlag[ iNuhLId ][ j ]
            MotionPredEnabledFlag[ iNuhLId ][ j ] = ( ( ( direct_dependency_type[ i ][ j ] +
1 )
& 2 ) >> 1 )
            NumMotionPredRefLayers[ iNuhLId ] += MotionPredEnabledFlag[ iNuhLId ][ j ]
        }
}
for( i = 1, mIdx = 0, sIdx = 0; i <= vps_max_layers_minus1; i++ ) {
    iNuhLId = layer_id_in_nuh[ i ]
    for( j = 0, j < i; j++ ) {
        if( MotionPredEnabledFlag[ iNuhLId ][ j ] )
            MotionPredRefLayerId[ iNuhLId ][ mIdx++ ] = layer_id_in_nuh[ j ]
        if( SamplePredEnabledFlag[ INuhLid ][ j ] )
            SamplePredRefLayerId[ iNuhLid ][ sIdx++ ] = layer_id_in_nuh[ j ]
    }
}
```

H.264/AVC and HEVC syntax allows many instances of parameter sets, and each instance is identified with a unique identifier. In H.264/AVC, each slice header includes the identifier of the picture parameter set that is active for the decoding of the picture that contains the slice, and each picture parameter set contains the identifier of the active sequence parameter set. Consequently, the transmission of picture and sequence parameter set does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A SEI NAL unit may contain one or more SEI message, which are not required for the decoding of output pictures but assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC and HEVC, an access unit comprises a primary coded picture and those NAL units that are associated with it. In HEVC, an access unit is defined as a set of NAL units that are associated with each other according to a specified classification rule, are consecutive in decoding order, and contain exactly one coded picture. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to the loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, an access unit may be defined as a set of NAL units that are associated with each other according to a specified classification rule, are consecutive in decoding order, and contain exactly one coded picture. In addition to containing the VCL NAL units of the coded picture, an access unit may also contain non-VCL-NAL units. In HEVC, the decoding of an access unit results in a decoded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In HEVC, a coded video sequence is defined to be a sequence of access units that consists, in decoding order, of a CRA (Clean Random Access) access unit that is the first access unit in the bitstream, and IDR access unit or a BLA (Broken Link Access) access unit, followed by zero or more non-IDR and non-BLA access units including all subsequent access units up to but no including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CDR NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. In HEVC a closed GOP may also start from BLA W DLP or a BLA N LP picture. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. The NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, predictive coding is applied for example as so-called sample prediction and/or so-called syntax prediction.

In the sample prediction, pixel or sample values in a certain picture area or "block" are predicted. These pixel or sample values can be predicted, for example, using one or more of the following ways:

Motion compensation mechanisms (which may also be referred to as temporal prediction or motion-compensated temporal prediction or motion-compensated prediction or MCP), which involve finding and indicating an area in one of the previously encoded video frames that corresponds closely to the block being coded.

Inter-view prediction, which involves finding and indicating an area in one of the previously encoded view components that corresponds closely to the block being coded.

View synthesis prediction, which involves synthesizing a prediction block or image area where a prediction block is derived on the basis of reconstructed/decoded ranging information.

Inter-layer prediction using reconstructed/decoded samples, such as the so-called IntraBL (base layer) mode of SVC.

Inter-layer residual prediction, in which for example the coded residual of a reference layer or a derived residual from a difference of a reconstructed/decoded reference layer picture and a corresponding reconstructed/decoded enhancement layer picture may be used for predicting a residual block of the current enhancement layer block. A residual block may be added for example to a motion-compensated prediction block to obtain a final prediction block for the current enhancement layer block.

Intra prediction, where pixel or sample values can be predicted by spatial mechanisms which involve finding and indicating a spatial region relationship.

In the syntax prediction, which may also be referred to as parameter prediction, syntax elements and/or syntax element values and/or variables derived from syntax elements are predicted from syntax elements (de)coded earlier and/or variables derived earlier. Non-limiting examples of syntax prediction are provided below:

In motion vector prediction, motion vectors e.g. for inter and/or inter-view prediction may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

The block partitioning, e.g. from CTU to CUs and down to PUs, may be predicted.

In filter parameter prediction, the filtering parameters e.g. for sample adaptive offset may be predicted.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be e.g. a Discrete Cosine Transform (DCT) or a variant thereof. After transforming the difference, the transformed difference is quantized and entropy coded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and included in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or picture). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

Inter prediction process may be characterized using one or more of the following factors.

The Accuracy of Motion Vector Representation.

For example, motion vectors may be of quarter-pixel accuracy, and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream in some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted e.g. from adjacent blocks and/or co-located blocks in temporal reference picture. Differential coding of motion vectors may be disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts (POC), while in explicit weighted prediction, prediction weights are explicitly indicated.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the TU (including e.g. DCT coefficient information). It may be signaled at CU level whether prediction error coding is applied or not for each CU. In the case there is no prediction error residual associated with the CU, it can be considered there are no TUs for the CU.

In some coding formats and codecs, a distinction is made between so-called short-term and long-term reference pictures. This distinction may affect some decoding processes such as motion vector scaling in the temporal direct mode or implicit weighted prediction. If both of the reference pictures used for the temporal direct mode are short-term reference pictures, the motion vector used in the prediction may be scaled according to the picture order count difference between the current picture and each of the reference pictures. However, if at least one reference picture for the temporal direct mode is a long-term reference picture, default scaling of the motion vector may be used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

A syntax structure for (decoded) reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC, reference picture marking syntax structures and related decoding processes have been replaced with a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to the reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a picture parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture, and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with CABAC or variable length coding. In general, the smaller the index is, the shorter the corresponding syntax element may become. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) may be constructed after the final reference picture lists (List 0 and List 1) have been constructed. The combined list may be used for uni-prediction (also known as uni-directional prediction) within B slices. However, in the final H.265/HEVC standard, no combined list is constructed.

A reference picture list, such as the reference picture list 0 and the reference picture list 1, may be constructed in two steps: First, an initial reference picture list is generated. The initial reference picture list may be generated for example on the basis of frame_num, POC, temporal_id, or information on the prediction hierarchy such as a GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

Since multiview video provides encoders and decoders the possibility to utilize inter-view redundancy, decoded inter-view frames may be included in the reference picture list(s) as well.

Examples of motion vector prediction schemes and related coding modes are provided in the next paragraphs.

In addition to the motion-compensated macroblock modes for which a differential motion vector is coded, a P macroblock may also be coded in the so-called P_Skip type in H.264/AVC. For this coding type, no differential motion vector, reference index, or quantized prediction error signal is coded into the bitstream. The reference picture of a macroblock coded with the P_Skip type has index 0 in reference picture list 0. The motion vector used for reconstructing the P_Skip macroblock is obtained using median motion vector prediction for the macroblock without any differential motion vector being added. P_Skip may be beneficial for compression efficiency particularly in areas where the motion field is smooth.

In B slices of H.264/AVC, four different types of inter prediction are supported: uni-predictive from reference picture list 0, uni-directional from reference picture list 1, bi-predictive, direct prediction, and B_skip. The type of inter prediction can be selected separately for each macroblock partition. B slices utilize a similar macroblock partitioning as P slices. For a bi-predictive macroblock partition, the prediction signal is formed by a weighted average of motion-compensated list 0 and list 1 prediction signals. Reference indices, motion vector differences, as well as quantized prediction error signal may be coded for uni-predictive and bi-predictive B macroblock partitions.

Two direct modes are included in H.264/AVC, temporal direct and spatial direct, and one of them can be selected into use for a slice in a slice header, although their use may be constrained further for example in profiles or alike. In the temporal direct mode, the reference index for reference picture list 1 is set to 0 and the reference index for reference picture list 0 is set to point to the reference picture that is used in the co-located block (compared to the current block cb) of the reference picture having index 0 in the reference picture list 1 if that reference picture is available, or set to 0 if that reference picture is not available. The motion vector predictor for cb is essentially derived by considering the motion information within a co-located block of the reference picture having index 0 in reference picture list 1. Motion vector predictors for a temporal direct block are derived by scaling a motion vector from the co-located block. The scaling is proportional to picture order count differences between the current picture and the reference pictures associated with the inferred reference indexes in list 0 and list 1, and by selecting the sign for the motion vector predictor depending on which reference picture list it is using.

In spatial direct mode of H.264/AVC, motion information of spatially adjacent blocks is exploited. Motion vector prediction in spatial direct mode can be divided into three steps: reference index determination, determination of uni- or bi-prediction, and motion vector prediction. In the first step, the reference picture with the minimum non-negative reference index (i.e., non-intra block) is selected from each of reference picture list 0 and reference picture list 1 of the neighboring blocks A, B, and C (where A is the adjacent block on the left of the current block, B is the adjacent block above the current block and C is the adjacent block on the top-right side of the current block). If no non-negative reference index exists in reference picture list 0 of the neighboring blocks A, B, and C, and likewise no non-negative reference index exists in reference picture list 1 of the neighboring blocks A, B, and C, reference index 0 is selected for both reference picture lists.

The use of uni- or bi-prediction for H.264/AVC spatial direct mode is determined as follows: If a minimum non-negative reference index for both reference picture lists was found in the reference index determination step, bi-prediction is used. If a minimum non-negative reference index for either but not both of reference picture list 0 or reference picture list 1 was found in the reference index determination step, uni-prediction from either reference picture list 0 or reference picture list 1, respectively, is used.

In the motion vector prediction for H.264/AVC spatial direct mode, certain conditions, such as whether a negative reference index was concluded in the first step, are checked and, if fulfilled, a zero motion vector is determined. Otherwise, the motion vector predictor is derived similarly to the motion vector predictor of P blocks using the motion vectors of spatially adjacent blocks A, B, and C.

No motion vector differences or reference indices are present in the bitstream for a direct mode block in H.264/AVC, while quantized prediction error signal may be coded and present therefore present in the bitstream. A B_skip macroblock mode in H.264/AVC is similar to the direct mode but no prediction error signal is coded and included in the bitstream.

Figure 5:
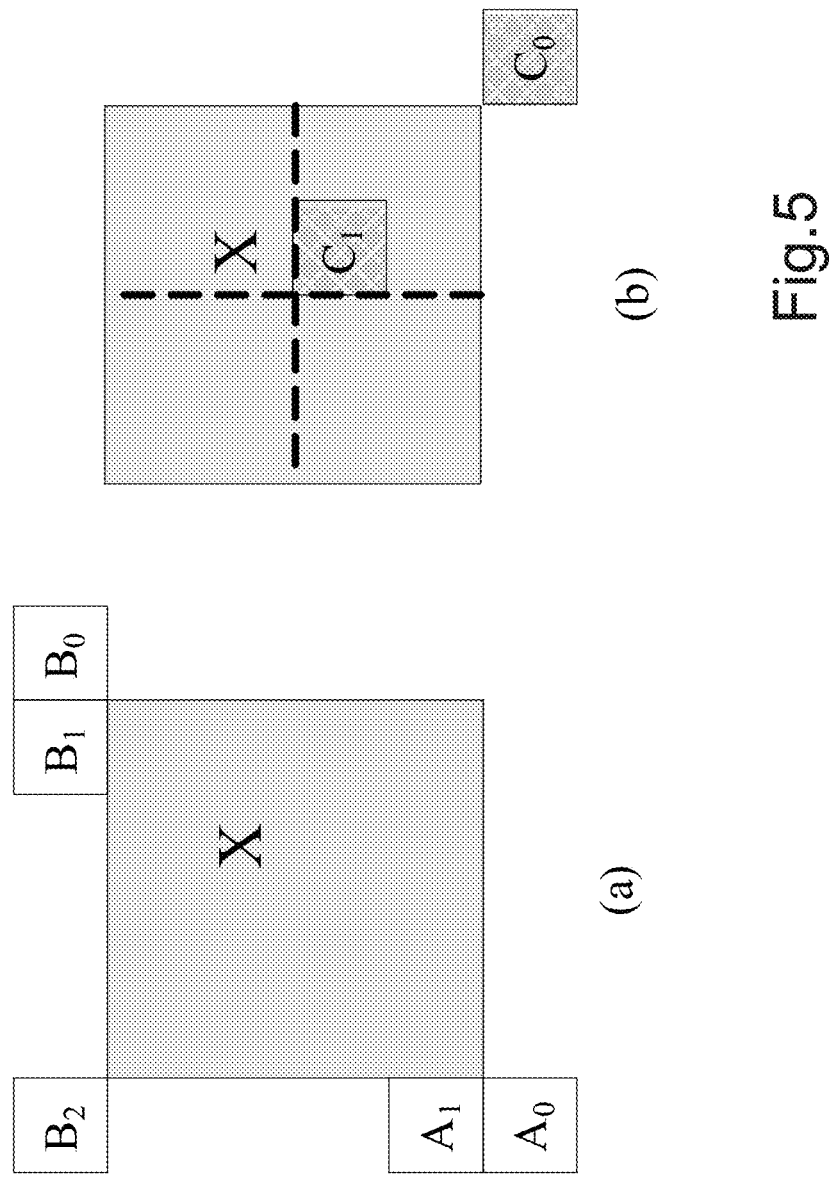
FIG. 5 shows sources of the candidate motion vector predictors.

H.265/HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates. The sources of the candidate motion vector predictors are presented in FIG. 5. X stands for the current prediction unit. $A_0$, $A_1$, $B_0$, $B_1$, $B_2$ in FIG. 5a are spatial candidates while $C_0$, $C_1$ in FIG. 5b are temporal candidates.

A candidate list derivation may be performed for example as follows, while it should be understood that other possibilities exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In H.265/HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighboring prediction blocks sharing identical motion information, which is only signaled once for each region. Another difference between AMVP and the merge mode in H.265/HEVC is that the maximum number of candidates of AMVP is 2 while that of the merge mode is 5.

The advanced motion vector prediction may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions: three spatial motion vector predictor candidate positions located above the current prediction block (B0, B1, B2) and two on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

The merging/merge mode/process/mechanism may operate for example as follows, while other similar realizations of the merge mode are also possible for example with different candidate position sets and candidate locations with candidate position sets.

In the merging/merge mode/process/mechanism, where all the motion information of a block/PU is predicted and used without any modification/correction. The aforementioned motion information for a PU may comprise one or more of the following: 1) The information whether 'the PU is uni-predicted using only reference picture list0' or 'the PU is uni-predicted using only reference picture list1' or 'the PU is bi-predicted using both reference picture list0 and list1'; 2) Motion vector value corresponding to the reference picture list0, which may comprise a horizontal and vertical motion vector component; 3) Reference picture index in the reference picture list0 and/or an identifier of a reference picture pointed to by the Motion vector corresponding to reference picture list 0, where the identifier of a reference picture may be for example a picture order count value, a layer identifier value (for inter-layer prediction), or a pair of a picture order count value and a layer identifier value; 4) Information of the reference picture marking of the reference picture, e.g. information whether the reference picture was marked as "used for short-term reference" or "used for long-term reference"; 5)-7) The same as 2)-4), respectively, but for reference picture list 1.

Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

One of the candidates in the merge list and/or the candidate list for AMVP or any similar motion vector candidate list may be a TMVP candidate or alike, which may be derived from the collocated block within an indicated or inferred reference picture, such as the reference picture indicated for example in the slice header. In HEVC, the reference picture list to be used for obtaining a collocated partition is chosen according to the collocated_from_l0_flag syntax element in the slice header. When the flag is equal to 1, it specifies that the picture that contains the collocated partition is derived from list 0, otherwise the picture is derived from list 1. When collocated_from_l0_flag is not present, it is inferred to be equal to 1. The collocated_ref_idx in the slice header specifies the reference index of the picture that contains the collocated partition. When the current slice is a P slice, collocated_ref_idx refers to a picture in list 0. When the current slice is a B slice, collocated_ref_idx refers to a picture in list 0 if collocated_from_l0 is 1, otherwise it refers to a picture in list 1. collocated_ref_idx always refers to a valid list entry, and the resulting picture is the same for all slices of a coded picture. When collocated_ref_idx is not present, it is inferred to be equal to 0.

In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

In HEVC, the availability of a candidate predicted motion vector (PMV) may be determined as follows (both for spatial and temporal candidates) (SRTP=short-term reference picture, LRTP=long-term reference picture):

| reference picture for target reference index | reference picture for candidate PMV | candidate PMV availability |
|---|---|---|
| STRP | STRP | "available" (and scaled) |
| STRP | LTRP | "unavailable" |
| LTRP | STRP | "unavailable" |
| LTRP | LTRP | "available" (but not scaled) |

In HEVC, when the target reference index value has been determined, the motion vector value of the temporal motion vector prediction may be derived as follows: The motion vector PMV at the block that is collocated with the bottom-right neighbor (location $C_0$ in FIG. 5b) of the current prediction unit is obtained. The picture where the collocated block resides may be e.g. determined according to the signalled reference index in the slice header as described above. If the PMV at location $C_0$ is not available, the motion vector PMV at location $C_1$ (see FIG. 5b) of the collocated picture is obtained. The determined available motion vector PMV at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the collocated block is a long-term reference picture (while the other is a short-term reference picture), the TMVP candidate may be considered unavailable. If both of the target reference picture and the reference picture of the motion vector of the collocated block are long-term reference pictures, no POC-based motion vector scaling may be applied.

Motion parameter types or motion information may include but are not limited to one or more of the following types:
- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or an indication of a reference picture type, such as a short-term reference picture and/or a long-term reference picture and/or an inter-layer reference picture (which may be indicated e.g. per reference picture)

a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);

a horizontal motion vector component (which may be indicated e.g. per prediction block or per reference index or alike);

a vertical motion vector component (which may be indicated e.g. per prediction block or per reference index or alike);

one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);

coordinates of a block to which the motion parameters and/or motion information applies, e.g. coordinates of the top-left sample of the block in luma sample units;

extents (e.g. a width and a height) of a block to which the motion parameters and/or motion information applies.

In general, motion vector prediction mechanisms, such as those motion vector prediction mechanisms presented above as examples, may include prediction or inheritance of certain pre-defined or indicated motion parameters.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and the bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) or motion field compression is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

Many video coding standards specify buffering models and buffering parameters for bitstreams. Such buffering models may be called Hypothetical Reference Decoder (HRD) or Video Buffer Verifier (VBV). A standard compliant bitstream complies with the buffering model with a set of buffering parameters specified in the corresponding standard. Such buffering parameters for a bitstream may be explicitly or implicitly signaled. 'Implicitly signaled' means for example that the default buffering parameter values according to the profile and level apply. The HRD/VBV parameters are used, among other things, to impose constraints on the bit rate variations of compliant bitstreams.

HRD conformance checking may concern for example the following two types of bitstreams: The first such type of bitstream, called Type I bitstream, is a NAL unit stream containing only the VCL NAL units and filler data NAL units for all access units in the bitstream. The second type of bitstream, called a Type II bitstream, may contain, in addition to the VCL NAL units and filler data NAL units for all access units in the bitstream, additional non-VCL NAL units other than filler data NAL units and/or syntax elements such as leading_zero_8 bits, zero_byte, start_code_prefix_one_3 bytes, and trailing_zero_8 bits that form a byte stream from the NAL unit stream.

Two types of HRD parameters (NAL HRD parameters and VCL HRD parameters) may be used. The HRD parameter may be indicated through video usability information included in the sequence parameter set syntax structure.

Buffering and picture timing parameters (e.g. included in sequence parameter sets and picture parameter sets referred to in the VCL NAL units and in buffering period and picture timing SEI messages) may be conveyed to the HRD, in a timely manner, either in the bitstream (by non-VCL NAL units), or by out-of-band means externally from the bitstream e.g. using a signalling mechanism, such as media parameters included in the media line of a session description formatted e.g. according to the Session Description Protocol (SDP). For the purpose of counting bits in the HRD, only the appropriate bits that are actually present in the bitstream may be counted. When the content of a non-VCL NAL unit is conveyed for the application by some means other than presence within the bitstream, the representation of the content of the non-VCL NAL unit may or may not use the same syntax as would be used if the non-VCL NAL unit were in the bitstream.

The HRD may contain a coded picture buffer (CPB), an instantaneous decoding process, a decoded picture buffer (DPB), and output cropping.

The CPB may operate on decoding unit basis. A decoding unit may be an access unit or it may be a subset of an access unit, such as an integer number of NAL units. The selection of the decoding unit may be indicated by an encoder in the bitstream.

The HRD may operate as follows. Data associated with decoding units that flow into the CPB according to a specified arrival schedule may be delivered by the Hypothetical Stream Scheduler (HSS). The arrival schedule may be determined by the encoder and indicated for example through picture timing SEI messages, and/or the arrival schedule may be derived for example based on a bitrate which may be indicated for example as part of HRD parameters in video usability information (which may be included in the sequence parameter set). The HRD parameters in video usability information may contain many sets of parameters, each for different bitrate or delivery schedule. The data associated with each decoding unit may be removed and decoded instantaneously by the instantaneous decoding process at CPB removal times. A CPB removal time may be determined for example using an initial CPB buffering delay, which may be determined by the encoder and indicated for example through a buffering period SEI message, and differential removal delays indicated for each picture for example though picture timing SEI messages. Each decoded picture is placed in the DPB. A decoded picture may be removed from the DPB at the later of the DPB output time or the time that it becomes no longer needed for inter-prediction reference. Thus, the operation of the CPB of the HRD may comprise timing of bitstream arrival, timing of decoding unit removal and decoding of decoding unit, whereas the operation of the DPB of the HRD may comprise removal of pictures from the DPB, picture output, and current decoded picture marking and storage.

The HRD may be used to check conformance of bitstreams and decoders.

Bitstream conformance requirements of the HRD may comprise for example the following and/or alike. The CPB is required not to overflow (relative to the size which may be indicated for example within HRD parameters of video usability information) or underflow (i.e. the removal time of a decoding unit cannot be smaller than the arrival time of the last bit of that decoding unit). The number of pictures in the DPB may be required to be smaller than or equal to a certain maximum number, which may be indicated for example in the sequence parameter set. All pictures used as prediction references may be required to be present in the DPB. It may be required that the interval for outputting consecutive pictures from the DPB is not smaller than a certain minimum.

Decoder conformance requirements of the HRD may comprise for example the following and/or alike. A decoder claiming conformance to a specific profile and level may be required to decode successfully all conforming bitstreams specified for decoder conformance provided that all sequence parameter sets and picture parameter sets referred to in the VCL NAL units, and appropriate buffering period and picture timing SEI messages are conveyed to the decoder, in a timely manner, either in the bitstream (by non-VCL NAL units), or by external means. There may be two types of conformance that can be claimed by a decoder: output timing conformance and output order conformance.

To check conformance of a decoder, test bitstreams conforming to the claimed profile and level may be delivered by a hypothetical stream scheduler (HSS) both to the HRD and to the decoder under test (DUT). All pictures output by the HRD may also be required to be output by the DUT and, for each picture output by the HRD, the values of all samples that are output by the DUT for the corresponding picture may also be required to be equal to the values of the samples output by the HRD.

For output timing decoder conformance, the HSS may operate e.g. with delivery schedules selected from those indicated in the HRD parameters of video usability information, or with "interpolated" delivery schedules. The same delivery schedule may be used for both the HRD and DUT. For output timing decoder conformance, the timing (relative to the delivery time of the first bit) of picture output may be required to be the same for both HRD and the DUT up to a fixed delay.

For output order decoder conformance, the HSS may deliver the bitstream to the DUT "by demand" from the DUT, meaning that the HSS delivers bits (in decoding order) only when the DUT requires more bits to proceed with its processing. The HSS may deliver the bitstream to the HRD by one of the schedules specified in the bitstream such that the bit rate and CPB size are restricted. The order of pictures output may be required to be the same for both HRD and the DUT.

In scalable video coding, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

As indicated earlier, MVC is an extension of H.264/AVC. Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture.

The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

In scalable multiview coding, the same bitstream may contain coded view components of multiple views and at least some coded view components may be coded using quality and/or spatial scalability.

Many video encoders utilize the Lagrangian cost function to find rate-distortion optimal coding modes, for example the desired macroblock mode and associated motion vectors. This type of cost function uses a weighting factor or $\lambda$ (lambda) to tie together the exact or estimated image distortion due to lossy coding methods and the exact or estimated amount of information required to represent the pixel/sample values in an image area. The Lagrangian cost function may be represented by the equation:

$$C = D + \lambda R$$

where C is the Lagrangian cost to be minimized, D is the image distortion (for example, the mean-squared error between the pixel/sample values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

In the following, the term layer is used in context of any type of scalability, including view scalability and depth enhancements. An enhancement layer refers to any type of an enhancement, such as SNR, spatial, multiview, depth, bit-depth, chroma format, and/or color gamut enhancement. A base layer also refers to any type of a base operation point, such as a base view, a base layer for SNR/spatial scalability, or a texture base view for depth-enhanced video coding.

Scalable video (de)coding may be realized with a concept known as single-loop decoding, where decoded reference pictures are reconstructed only for the highest layer being decoded while pictures at lower layers may not be fully decoded or may be discarded after using them for inter-layer prediction. In single-loop decoding, the decoder performs motion compensation and full picture reconstruction only for the scalable layer desired for playback (called the "desired layer" or the "target layer"), thereby reducing decoding complexity when compared to multi-loop decoding. All of the layers other than the desired layer do not need to be fully decoded because all or part of the coded picture data is not needed for reconstruction of the desired layer. However, lower layers (than the target layer) may be used for inter-layer syntax or parameter prediction, such as inter-layer motion prediction. Additionally or alternatively, lower layers may be used for inter-layer intra prediction and hence intra-coded blocks of lower layers may have to be decoded. Additionally or alternatively, inter-layer residual prediction may be applied, where the residual information of the lower layers may be used for decoding of the target layer and the residual information may need to be decoded or reconstructed. In some coding arrangements, a single decoding loop is needed for decoding of most pictures, while a second decoding loop may be selectively applied to reconstruct so-called base representations (i.e. decoded base layer pictures), which may be needed as prediction references but not for output or display.

There are ongoing standardization activities to specify a multiview extension of HEVC (which may be referred to as MV-HEVC), a depth-enhanced multiview extension of HEVC (which may be referred to as 3D-HEVC), and a scalable extension of HEVC (which may be referred to as SHVC). A multi-loop decoding operation has been envisioned to be used in all these specifications.

In scalable video coding schemes utilizing multi-loop (de)coding, decoded reference pictures for each (de)coded layer may be maintained in a decoded picture buffer (DPB). The memory consumption for DPB may therefore be significantly higher than that for scalable video coding schemes with single-loop (de)coding operation. However, multi-loop (de)coding may have other advantages, such as relatively few additional parts compared to single-layer coding.

In scalable video coding with multi-loop decoding, enhanced layers may be predicted from pictures that had been already decoded in the base (reference) layer. Such pictures may be stored in the DPB of base layer and may be marked as used for reference. In certain circumstances, a picture marked as used for reference may be stored in fast memory, in order to provide fast random access to its samples, and may remain stored after the picture is supposed to be displayed in order to be used as reference for prediction. This imposes requirements on memory organization. In order to relax such memory requirements, a conventional design in multi-loop multilayer video coding schemes (such as MVC) assumes restricted utilization of inter-layer predictions. Inter-layer/inter-view prediction for enhanced view is allowed from a decoded picture of the base view located at the same access unit, in other word representing the scene at the same time entity. In such designs, the number of reference pictures available for predicting enhanced views is increased by 1 for each reference view.

It has been proposed that in scalable video coding with multi-loop (de)coding operation pictures marked as used for reference need not originate from the same access units in all layers. For example, a smaller number of reference pictures may be maintained in an enhancement layer compared to the base layer. In some embodiments a temporal inter-layer prediction, which may also be referred to as a diagonal inter-layer prediction or diagonal prediction, can be used to improve compression efficiency in such coding scenarios. In general, diagonal prediction may refer to any prediction where the prediction crosses more than one scalability domain or scalability type. For example, diagonal prediction may refer to prediction that takes place from a different component type (e.g. from depth to texture) and from a different time instant (e.g. from a picture of a previous access unit in (de)coding order to a picture in the current access unit).

A decoding process may be specified with reference to a layer identifier list TargetDecLayerIdList, which specifies the list of layer identifier values, such as nuh_layer_id values. The layer identifier values may be in TargetDecLayerIdList in increasing order of the NAL units to be decoded. TargetDecLayerIdList may include the layer identifiers for layers that are intended to be output by the decoder as well as all the layers on which the output layers depend in the decoding process.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). Currently, two designs to realize scalability are investigated for SHVC. One is reference index based, where an inter-layer reference picture can be included in a one or more reference picture lists of the current picture being coded or decoded (as described above). Another may be referred to as IntraBL or TextureRL, where a specific coding mode, e.g. in CU level, is used for using decoded/reconstructed sample values of a reference layer picture for prediction in an enhancement layer picture. The SHVC development has concentrated on development of spatial and coarse grain quality scalability.

It is possible to use many of the same syntax structures, semantics, and decoding processes for MV-HEVC and reference-index-based SHVC. Furthermore, it is possible to use the same syntax structures, semantics, and decoding processes for depth coding too. Hereafter, term scalable multiview extension of HEVC (SMV-HEVC) is used to refer to a coding process, a decoding process, syntax, and semantics where largely the same (de)coding tools are used regardless of the scalability type and where the reference index based approach without changes in the syntax, semantics, or decoding process below the slice header is used. SMV-HEVC might not be limited to multiview, spatial, and coarse grain quality scalability but may also support other types of scalability, such as depth-enhanced video.

For the enhancement layer coding, the same concepts and coding tools of HEVC may be used in SHVC, MV-HEVC, and/or SMV-HEVC. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or SMV-HEVC codec.

In MV-HEVC, SMV-HEVC, and reference index based SHVC solution, the block level syntax and decoding process are not changed for supporting inter-layer texture prediction. Only the high-level syntax has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. IRAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in MV-HEVC, SMV-HEVC, and a reference index based SHVC solution may be initialized using a specific process in which the inter-layer reference picture(s), if any, may be included in the initial reference picture list(s). are constructed as follows. For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information, such as the RefLayerId[i] variable derived from the VPS extension as described above. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

In the coding and/or decoding process, the inter-layer reference pictures may be treated as a long-term reference pictures.

In SMV-HEVC and a reference index based SHVC solution, inter-layer motion parameter prediction may be performed by setting the inter-layer reference picture as the collocated picture for TMVP derivation. A motion field mapping process between two layers may be performed for example to avoid block level decoding process modification in TMVP derivation. A motion field mapping could also be performed for multiview coding, but a present draft of MV-HEVC does not include such a process. The use of the motion field mapping feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

In a motion field mapping process for spatial scalability, the motion field of the upsampled inter-layer reference picture is attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture. The block size used for the derivation of the motion parameters and/or prediction mode in the upsampled inter-layer reference picture may be for example 16×16. The 16×16 block size is the same as in HEVC TMVP derivation process where compressed motion field of reference picture is used.

In a textureRL based SHVC solution, the inter-layer texture prediction may be performed at CU level for which a new prediction mode, named as textureRL mode, is introduced. The collocated upsampled base layer block is used as the prediction for the enhancement layer CU coded in textureRL mode. For an input CU of the enhancement layer encoder, the CU mode may be determined among intra, inter and textureRL modes, for example. The use of the textureRL feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred. Furthermore, the textureRL may be selected by the encoder at CU level and may be indicated in the bitstream per each CU for example using a CU level flag (texture_rl_flag) which may be entropy-coded e.g. using context adaptive arithmetic coding (e.g. CABAC).

The residue of textureRL predicted CU may be coded as follows. The transform process of textureRL predicted CU may be the same as that for the intra predicted CU, where a discrete sine transform (DST) is applied to TU of luma component having 4×4 size and a discrete cosine transform (DCT) is applied to the other type of TUs. Transform coefficient coding of a textureRL-predicted CU may be the same to that of inter predicted CU, where no_residue_flag may be used to indicate whether the coefficients of the whole CU are skipped.

In a textureRL based SHVC solution, in addition to spatially and temporally neighboring PUs, the motion parameters of the collocated reference-layer block may also be used to form the merge candidate list. The base layer merge candidate may be derived at a location collocated to the central position of the current PU and may be inserted in a particular location of the merge list, such as the first candidate in merge list. In the case of spatial scalability, the reference-layer motion vector may be scaled according to the spatial resolution ratio between the two layers. The pruning (duplicated candidates check) may be performed for each spatially neighboring candidate with collocated base layer candidate. For the collocated base layer merge candidate and spatial merge candidate derivation, a certain maximum number of merge candidates may be used; for example four merge candidates may be selected among candidates that are located in six different positions. The temporal merge candidate may be derived in the same manner as done for HEVC merge list. When the number of candidates does not reach to maximum number of merge candidates (which may be determined by the encoder and may be indicated in the bitstream and may be assigned to the variable MaxNumMergeCand), the additional candidates, including combined bi-predictive candidates and zero merge candidates, may be generated and added at the end of the merge list, similarly or identically to HEVC merge list construction.

In some coding and/or decoding arrangements, a reference index based scalability and a block-level scalability approach, such a textureRL based approach, may be combined. For example, multiview-video-plus-depth coding and/or decoding may be performed as follows. A textureRL approach may be used between the components of the same view. For example, a depth view component may be inter-layer predicted using a textureRL approach from a texture view component of the same view. A reference index based approach may be used for inter-view prediction, and in some embodiments inter-view prediction may be applied only between view components of the same component type.

Work is also ongoing to specify depth-enhanced video coding extensions to the HEVC standard, which may be referred to as 3D-HEVC, in which texture views and depth views may be coded into a single bitstream where some of the texture views may be compatible with HEVC. In other words, an HEVC decoder may be able to decode some of the texture views of such a bitstream and can omit the remaining texture views and depth views.

Other types of scalability and scalable video coding include bit-depth scalability, where base layer pictures are coded at lower bit-depth (e.g. 8 bits) per luma and/or chroma sample than enhancement layer pictures (e.g. 10 or 12 bits), chroma format scalability, where enhancement layer pictures provide higher fidelity and/or higher spatial resolution in chroma (e.g. coded in 4:4:4 chroma format) than base layer pictures (e.g. 4:2:0 format), and color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut. Any number of such other types of scalability may be realized for example with a reference index based approach or a block-based approach e.g. as described above.

A way of categorizing different types of prediction is to consider across which domains or scalability types the prediction crosses. This categorization may lead into one or more of the following types of prediction, which may also sometimes be referred to as prediction directions:

Temporal prediction e.g. of sample values or motion vectors from an earlier picture usually of the same scalability layer, view and component type (texture or depth).

Inter-view prediction (which may be also referred to as cross-view prediction) referring to prediction taking place between view components usually of the same time instant or access unit and the same component type.

Inter-layer prediction referring to prediction taking place between layers usually of the same time instant, of the same component type, and of the same view.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

Prediction approaches using image information from a previously coded image can also be called as inter prediction methods. Inter prediction may sometimes be considered to only include motion-compensated temporal prediction, while it may sometimes be considered to include all types of prediction where a reconstructed/decoded block of samples is used as prediction source, therefore including conventional inter-view prediction for example. Inter prediction may be considered to comprise only sample prediction but it may alternatively be considered to comprise both sample and syntax prediction. As a result of syntax and sample prediction, a predicted block of pixels of samples may be obtained.

If the prediction, such as predicted variable values and/or prediction blocks, is not refined by the encoder using any form of prediction error or residual coding, prediction may be referred to as inheritance. For example, in the merge mode of HEVC, the prediction motion information is not refined e.g. by (de)coding motion vector differences, and hence the merge mode may be considered as an example of motion information inheritance.

The several embodiments of the invention relates to scalable video coding, including spatial, quality, multiview and/or depth scalability. Video coding schemes may utilize a prediction scheme between pictures. As discussed, prediction may be performed in the encoder for example through a process of block partitioning and block matching between a currently coded block (Cb) in the current picture and a reference block (Rb) in the picture which is selected as a reference. Therefore parameters of such prediction can be defined as motion information (MI) comprising for example on or more of the following: spatial coordinates of the Cb (e.g. coordinates of the top-left pixel of the Cb); a reference index refIdx or similar which specifies the picture in the reference picture list which is selected as reference picture; a motion vector (MV) specifying displacement between the spatial coordinated of the Cb and Rb in the reference picture; and the size and shape of the motion partition (the size and shape of the matching block).

A motion field associated with a picture may be considered to comprise a set of motion information produced for every coded block of the picture. A motion field may be accessible by coordinates of a block, for example. A motion field may be used for example in Temporal motion vector prediction or any other motion prediction mechanism where a source or a reference for prediction other than the current decoded/coded picture is used.

Video coding schemes may utilize a temporal motion vector prediction scheme, such as the temporal direct mode in H.264/AVC or the temporal motion vector predictor (TMVP) candidate in the merge and AVMP modes of H.265/HEVC. In a temporal motion vector prediction scheme, at least a subset of the motion information of another picture is used to derive motion information or motion information predictor(s) for the current picture. Temporal motion vector prediction therefore requires storage of motion information of reference pictures.

In H.265/HEVC, the sequence parameter set includes the sps_temporal_mvp_enabled_flag syntax element, which indicates if the slice header includes the slice_temporal_mvp_enabled flag. If sps_temporal_mvp_enabled_flag is equal to 0, no temporal motion vector predictors are used in the coded video sequence. slice_temporal_mvp_enabled_flag specifies whether temporal motion vector predictors can be used for inter prediction. When slice_temporal_mvp_enabled_flag is equal to 1, there are syntax elements in the slice header that identify the collocated picture used to derive the temporal motion vector predictors.

Temporal motion vector prediction can also be used in scalable video coding when a motion field of an inter-layer reference picture is used to predict or derive motion information of the current picture.

Motion field mapping may be used for example when an inter-layer reference picture is of different spatial resolution than the current picture. In a motion field mapping process for spatial scalability, the motion field of the upsampled inter-layer reference picture is attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture.

The storage of motion information may be performed for example on the basis of the minimum size of a motion partition, e.g. 4×4 (of luma samples) in the case of H.264/AVC. In another example, the spatial granularity of motion information may be pre-defined for example in a coding standard and the coded motion information may be resampled or converted to that spatial granularity. For example, motion information can be stored for 16×16 blocks (of luma samples) in H.265/HEVC.

It is known to add a flag in SPS extension to indicate constraint on collocated picture, such that the collocated picture is an inter-layer reference picture rather than a temporal reference pictures for non-base layer coding. As a result, the motion information of temporal reference pictures within current enhancement layer need not be stored. The semantics of the flag was proposed to be the following: collocated_picture_constraint_flag equal to 1 specifies that collocated picture used for inter-layer prediction are constrained in the CVS. When collocated_picture_constraint_flag is equal to 1, the collocated picture used for inter-layer prediction shall be the reference picture with nuh_layer_id not equal to that of current picture. When collocated_picture_constraint_flag is equal to 0, no constraint for the collocated picture used for inter-layer prediction is signaled by this flag. When not present, the collocated_picture_constraint_flag is inferred to be equal to 0.

Codec implementations may have different approaches for storing of motion information. Assuming that motion information is stored for a regular grid of blocks, one example approach may be to store for each block in the grid the following:

1. Indication of the number of motion-compensated prediction blocks (2 bits). 0 indicates that there are no prediction blocks (e.g. when intra coding was used), 1 indicates uni-prediction, and 2 indicates bi-prediction;
2. Reference picture list indices for reference picture list 0 and list 1. In H.265/HEVC, the index may be limited for example to 0 to 15, inclusive, and hence 8 bits is needed for reference index storage. Additionally, reference picture lists have to be stored for each slice of the picture.

3. Horizontal and vertical motion vector components for the motion vector (uni-prediction) or the tow motion vectors (bi-prediction). The number of bits required to store a motion vector component may depend for example on level limits, picture extents, and/or specific constraints that may be for example inferred by a coding profile of specifically indicated in the bitstream. Generally, for example 2 bytes per motion vector component may be needed Assuming that no. 1 above can be stored in spare bits left over by a motion vector components not requiring a full two bytes for storage, it may take for example 9 bytes to store motion information for a single block. In 16×16 motion block size (of luma samples), a motion field using 9 bytes per block for motion information is about 2.3% of the storage space needed to store sample values of a reference picture of 4:2:0 chroma format.

For example in H.264/AVC, it may be sufficient to store only reference index to reference picture list 0 (if present) or to reference picture list 1 otherwise and only one pair of horizontal and vertical motion vector components. It may therefore take 5 bytes to store motion information per block in a motion field. In 4×4 motion block size (of luma samples), a motion field using 5 bytes per block for motion information is about 20.8% of the storage space needed to store sample values of a reference picture of 4:2:0 chroma format.

As can be understood form these examples on the storage space usage, the amount of memory used for motion field storage can be substantial, and hence it would be beneficial to indicate which motion fields are actually needed for a temporal motion vector prediction mechanism or alike, such as the TMVP mechanism of H.265/HEVC or alike, in order to allow optimized memory usage in decoders.

In H.265/HEVC, the sps_temporal_mvp_enabled_flag indicates whether the TMVP mechanism may be in use (when the flag is equal to 1) or is not in use (when the flag is equal to 0) in the HEVC base layer/view (with nuh_layer_id equal to 0). When sps_temporal_mvp_enabled_flag is equal to 1, the slice_temporal_mvp_enabled_flag is present in the slice header and indicates if the TMVP mechanism is in use for the current picture.

There may be "black box" implementations of scalable extensions of HEVC, where the base layer decoding/coding is implemented with an existing HEVC v1 implementation without changes. Such an implementation of base layer decoding/coding would store motion fields only if sps_temporal_mvp_enabled_flag is equal to 1.

Base layer motion fields may be used for either or both of the following two purposes: temporal motion vector prediction between pictures of the base layer and inter-layer motion prediction. If the base layer motion fields are used only for inter-layer motion prediction, the memory used for base layer motion fields could be de-allocated or used for other purposes after decoding of the access unit has been finished (or, more accurately, decoding of all layers within the access unit that may use the abase layer as motion prediction reference has been finished). However, when sps_temporal_mvp_enabled_flag is used to control the storage of base layer motion fields, it cannot be used to indicate that base layer motion fields are used only for inter-layer motion prediction and not for temporal motion vector prediction within the base layer.

If a first enhancement layer for which the collocated_picture_constraint_flag (as described above) is set equal to 1 is used as a reference for inter-layer prediction for a second enhancement layer, the storage of the motion field of pictures in the first enhancement layer may be needed for inter-layer motion prediction. In other words, the described collocated_picture_constraint_flag is not sufficient to determine if the motion field of the enhancement layer picture needs to be stored or not.

While the known approaches aim at controlling the motion field memory usage for entire layers within a sequence, a finer granularity within a layer may be desired and/or indications to reduce the needed storage space of a motion field may be desired. The total memory use for motion field storage may then be controlled and may be smaller than the memory use assuming a maximum amount of reference pictures for each of which a motion field is stored.

The present embodiments allow the encoder to indicate or control the motion field storage for the decoder in one or more of the following ways:

a) Motion fields of the base layer are to be stored but may only be needed for inter-layer motion prediction (and are not needed for motion prediction for any other picture in the base layer). Discussed in more detailed in section "A";

b) Indications related to motion field storage and/or use reside in sequence-level syntax structures but may be limited to apply to only some picture within a layer. Discussed in more detailed in section "B";

c) The storage or marking of a motion field of a picture may be controlled with a later picture for example using reference motion field set syntax. The storage or marking of a motion field may differ from the storage or corresponding marking of a corresponding reference picture. Discussed in more detailed in section "C";

d) The storage space required by a motion field may be controlled by the encoder with various indicated constraints. Discussed in more detailed in section "D".

Section A) Sequence-Level Indications for Motion Field Storage

In some embodiments, two or more of the following are indicated by the encoder in the bitstream and/or decoded by the decoder from the bitstream: 1) An indication capable of indicating if motion fields may be used within a layer for temporal motion vector prediction or are not used within a layer for temporal motion vector prediction. This indication may be layer-wise; 2) An indication capable of indicating if inter-layer motion prediction may be used or if inter-layer motion prediction is not used. This indication may be specific to a pair of layers; 3) An indication capable of indicating if diagonal motion prediction may be used or if diagonal motion prediction is not used. This indication may be specific to pair of layers.

For example, in the context of H.265/HEVC and/or its extensions, an indication capable of indicating if motion fields may be used within a layer for temporal motion vector prediction or are not used within a layer for temporal motion vector prediction may be specified for example in the SPS extension. For example, the following syntax may be used:

| | Descriptor |
|---|---|
| sps_extension( ) { | |
| ... | |
| collocated_picture_constraint_flag | u(1) |
| ... | |
| } | |

The semantics of collocated_picture_constraint_flag may be specified for example as follows or in any similar manner. collocated_picture_constraint_flag equal to 1 indicates the following:

For coded slice segment NAL units with nuh_layer_id equal to 0, collocated_picture_constraint_flag equal to 1 indicates that slice_temporal_mvp_enabled_flag is not present or is equal to 0.

For coded slice segment NAL units with nuh_layer_id greater than 0, collocated_picture_constraint_flag equal to 1 indicates that the collocated picture, if any, is an inter-layer reference picture.

It should be understood that the semantics of collocated_picture_constraint_flag or alike may be specified equivalently with other phrasing. For example, the following phrasing could be used: collocated_picture_constraint_flag equal to 1 indicates the following:

In coded slice segment NAL units with nuh_layer_id equal to 0 for which this SPS is the active SPS, slice_temporal_mvp_enabled_flag is not present or is equal to 0.

In coded slice segment NAL units with nuh_layer_id nuhLayerIdA greater 0 for which this SPS is the active layer SPS, the collocated picture, if any, has nuh_layer_id nuhLayerIdB that is not equal to nuhLayerIdA When collocated_picture_constraint_flag is equal to 0, no constraint for the collocated picture is indicated. When not present, the collocated_picture_constraint_flag is inferred to be equal to 0.

The collocated_picture_constraint_flag or alike may be used, for example for determining if storing of motion fields is needed, together with an indication capable of indicating if inter-layer motion prediction may be used or is not used. For example, in the context of H.265/HEVC and/or its extensions, an indication capable of indicating if inter-layer motion prediction may be used or if inter-layer motion prediction is not used may be performed through the direct_dependency_type[i][j] syntax element of the VPS extension.

In some embodiments, a decoder may store motion fields as part of decoding a picture when any of the indications 1 to 3 above indicates that motion prediction may be used.

In some embodiments, an encoder and/or a decoder may store motion fields as part of decoding/coding a current picture at a particular layer (e.g. layer A) when at least one of the following is true:

It is indicated in the bitstream that temporal motion vector prediction may be used within the layer.

It is indicated in the bitstream that inter-layer and/or diagonal prediction may be used and the pictures that may use the current picture as a reference for motion prediction may be or are present in the bitstream and are intended to be decoded.

For example, if the motion field of the picture is indicated not to be used for motion prediction for any other picture at layer A, and if layer A may be used as reference for inter-layer and/or diagonal motion prediction for other layers, but none of those other layers are present in the bitstream or are not intended to be decoded, the motion field of the picture (at layer A) need not be stored and decoders may determine not to store the motion field of the picture (at layer A). Otherwise, the motion field of the picture (at layer A) may be needed for inter-layer and/or diagonal motion prediction for other layers and hence decoders store the motion field.

The encoder and/or the decoder may conclude that the motion field or the motion vectors of the current picture have to be stored when they may be used for temporal motion vector prediction of other pictures in the same layer or when they may be used for inter-layer motion prediction. When HEVC and/or HEVC extensions are used, the encoder and/or the decoder may conclude that the motion field or the motion vectors of the current picture have to be stored when at least one of the following is true:

sps_temporal_mvp_enabled_flag is equal to 1 and collocated_picture_constraint_flag is equal 0.

collocated_picture_constraint_flag is equal to 1 and there is a nuh_layer_id value nuhLayerIdA such that MotionPredRefLayerId[nuhLayerIdA][mIdx] for any mIdx in the range of 0 to NumMotionPredRefLayers[nuhLayerIdA]−1, inclusive, is equal to the nuh_layer_id value of the current picture and nuhLayerIdA is among TargetDecLayerIdList.

The encoder and/or the decoder may conclude that the motion field or the motion vectors of a picture need no longer be stored when either the picture is marked as "unused for reference" or when the picture is not used for temporal motion vector prediction of other pictures in the same layer and all pictures in the same access unit that may use the picture as a reference for inter-layer motion prediction have been decoded. When HEVC and/or HEVC extensions are used, the encoder and/or the decoder may conclude that the motion field or the motion vectors of a picture need no longer be stored when at least one of the following is true:

The picture is marked as "unused for reference".

collocated_picture_constraint_flag is equal to 1 for the picture and the access unit containing the picture has been decoded.

collocated_picture_constraint_flag is equal to 1 for the picture and there is no nuh_layer_id value nuhLayerIdA among those values of TargetDecLayerIdList that remain to be decoded from the access unit containing the picture such that MotionPredRefLayerId[nuhLayerIdA][mIdx] for any mIdx in the range of 0 to NumMotionPredRefLayers[nuhLayerIdA]−1, inclusive, is equal to the nuh_layer_id value of the picture.

Section B) Sequence-Level Sub-Layer-Wise Indications for Motion Field Storage

In some embodiments, the indications relate to motion field storage and/or use reside in sequence-level syntax structures but may be limited to apply to only some pictures within a layer. The limited scope may be determined and indicated in the bitstream by the encoder and decoded from the bitstream by the decoder. For example, the indications may apply to only certain temporal sub-layers and/or picture types (such as IRAPs). Different scope may be selected for different indications or the same type of indication for different layers or pairs of layers.

Section C) Flexible Control of which Motion Fields are Stored

In some embodiments, an encoder and/or decoder may deallocate a motion field storage buffer or use a motion field storage buffer for storing another motion field, when the motion field in the storage buffer is no longer needed for temporal, inter-layer or diagonal motion prediction. In some embodiments, an encoder and/or a decoder may mark a motion field or a corresponding reference picture e.g. as "motion field not needed for prediction" or anything alike, when the motion field in the storage buffer is no longer needed for temporal, inter-layer or diagonal motion prediction. Likewise, when a motion field is decoded and stored, it or the corresponding reference picture may be marked by the encoder and/or the decoder as "motion field needed for prediction" or anything alike.

The maximum number of motion fields are stored and/or marked as "motion field needed for prediction" may be limited. This number may be pre-defined for example in a coding standard and/or may be determined by the encoder and indicated in the bitstream. The maximum number may be decoded from the bitstream by the decoder. The maximum number may be specific to temporal sub-layers and may be separately indicated by the encoder for one or more temporal sub-layers within bitstream. The maximum number may be lower than the maximum number of reference pictures.

The motion fields that are stored and/or marked as "motion field needed for prediction" may be inferred by the encoder and/or the decoder using a specific algorithm and/or may be determined by the encoder and indicated by the encoder in the bitstream and decoded by the decoder from the bitstream Said specific algorithm may be pre-defined for example in a coding standard. In some embodiments, many algorithms may be specified for example in a coding standard and/or many parameter values controlling the algorithms may be used. The encoder may determine which of said many algorithms is in use and which parameter values controlling the algorithm are used and indicate those in the bitstream. Likewise, the decoder may decode which of said many algorithms is in use and which parameter values controlling the algorithm are used from the bitstream. For example, an algorithm may realize first-in-first-out (FIFO) buffering of motion fields. An action according to said algorithm may be triggered for example when the number of occupied motion field storage buffers reaches or is about to exceed the maximum number. For example, an action may be that a motion field selected according to FIFO buffering in is deallocated or marked as "motion field not needed for prediction".

In some embodiments, the encoder may encode in the bitstream and/or the decoder may decode from the bitstream commands similar to MMCO of H.264/AVC for controlling motion field marking.

In some embodiments, the encoder may encode in the bitstream and/or the decoder may decode from the bitstream a reference motion field set (RMFS) similarly to a reference picture set (RPS) in H.265/HEVC. An RFMS syntax structure may include syntax elements from which identifiers of motion fields included in RFMS may be concluded. The identifiers may for example be picture identifiers, such as picture order counts or a part thereof (e.g. a certain number of the least significant bits of the POC values), picture order count differences (e.g. compared to the picture order count of the current picture), and/or frame_num values or similar. An RFMS syntax structure may for example have the same syntax as an RPS syntax structure but an RFMS syntax structure may apply to a motion fields rather than decoded sample arrays (to which an RPS syntax structure may apply). The encoder and/or the decoder may keep those motion fields that are included in the RFMS in the memory (e.g. in a decoded motion field buffer) and/or marked as "motion field needed for prediction" (or alike). The encoder and/or the decoder may remove those motion fields that are not included in the RFMS from the memory (e.g. from a decoded motion field buffer) and/or mark them as "motion field not needed for prediction" (or alike).

In some embodiments, the syntax of RPS is appended to indicate whether or not a motion field is stored with the decoded picture included in the RPS. For example, a flag may be included for each picture in the RPS, which specifies that, when the flag is 1, the storage or presence of the motion field or that, when the flag is 0, the absence of the motion field. The encoder and/or the decoder may store those motion fields that are indicated to be present and/or mark them as "motion field needed for prediction" (or alike). The encoder and/or the decoder may remove those motion fields that are indicated to be absent and/or mark them as "motion field not needed for prediction" (or alike).

The encoder may be required to keep the number of motion fields marked as "motion field not needed for prediction" (or alike) according to RFMS or RPS not higher than the maximum number of motion fields.

In some embodiments, the encoder may encode in the bitstream and/or the decoder may decode from the bitstream a first picture-wise indication, for example residing in a slice header, whether the picture may be used as collocated picture for TMVP or alike for any subsequent picture in the same layer. Alternatively or in addition, in some embodiments, the encoder may encode in the bitstream and/or the decoder may decode from the bitstream a second picture-wise indication, for example residing in a slice header, whether the picture may be used as a collocated picture for TMVP or alike for any subsequent picture in the same layer or other layers. In some embodiments, the first and/or second picture-wise indication may be used to control the storage and/or marking of the motion field or the corresponding picture. For example, if the second indication is false (i.e. the picture is not used as collocated picture for TMVP or alike for any subsequent picture), the motion field or the corresponding picture may be marked as "motion field not needed for prediction". In another example, if the first indication is false (i.e. the picture is not used as collocated for TMVP or alike for any subsequent picture in the same layer), the motion field or the corresponding picture may be marked as "motion field needed for prediction" until all pictures which may use the picture as collocated picture have been decoded after which the motion field or the corresponding picture may be marked as "motion field not needed for prediction". For example, a picture where the first indication is false may be marked as "motion field not needed for prediction" after the access unit in which the picture resides has been decoded (assuming no diagonal prediction is in use).

In some embodiments, the first picture-wise indication and/or the second picture-wise indication as described above may be specific to certain temporal sub-layers. For example, if the first or second picture-wise indication is true for a picture with TemporalId equal to tIdA, the picture may be used as collocated picture for TMVP or alike for those subsequent pictures within the same layer that have TemporalId greater than or equal to tIdA.

In some embodiments, it may be considered that motion fields are stored in a decoded motion field buffer (DMFB) or alike which may operate similarly to a decoded picture buffer. The encoder may encode in the bitstream and the decoder may decode from the bitstream syntax elements and/or syntax element values that relate to the operation of the DMFB. Constraints may be specified for example in a coding standard for the DMFB, for example, when it comes to the maximum number of motion field buffers in the DMFB and/or the maximum memory use of the DMFB.

Section D) Flexible Control of which Motion Information are Stored

In some embodiments, the encoder may indicate in the bitstream and the decoder may decode from the bitstream a spatial relation or accuracy for storing motion information. For example, a block size of luma samples for which the decoded/coded motion information is resampled may be indicated. For example, it may be indicated that motion information may be stored for 32×32 blocks of luma samples. In some embodiments, the block size may be spatially varying. In some embodiments, the block size may be selected according to prediction units of the corresponding pictures.

In some embodiments, the encoder may indicate in the bitstream and the decoder may decode from the bitstream which parameters of the motion information are or may be needed in the motion prediction. For example, one or more of the following indications may be encoded by the encoder and/or decoded by the decoder:

Only inter-layer reference pictures are used for a particular enhancement layer and hence motion vector values may be restricted e.g. to (0, 0) in case of spatial and/or SNR scalability and to (x, 0) for multiview coding with parallel camera setup. Consequently, the motion field storage for that enhancement layer can be tuned to store only a subset of motion vector components.

Only inter-layer reference pictures are used (for sample prediction) and only a certain reference layer may be used as source for sample prediction for a particular enhancement layer (e.g. as indicated by direct_dependency_type[i][j]). Consequently, the motion field storage for that particular enhancement layer can be tuned to omit reference index storage or any other storage indicating which reference picture is used for sample prediction.

Only uni-prediction is used.

In some embodiments, the encoder may infer or indicate in the bitstream and the decoder may infer or decode from the bitstream constraints on parameters of the motion information which can help in reducing the storage space for motion fields. For example, one or more of the following may be inferred or encoded by the encoder and/or inferred or decoded by the decoder:

Motion vector accuracy. For example, certain types of pictures or layers, such as depth pictures or layers, may be inferred to have motion vectors of integer luma sample accuracy and hence motion fields for depth pictures need to be stored at integer-sample accuracy. In another example, the encoder may encode in the bitstream and the decoder may decode from the bitstream and indication of motion vector accuracy. In another example, a first layer, for example, representing a texture view, may be used as motion prediction reference for another layer, for example representing a depth view, but no motion prediction within the first layer takes place. In this case, the motion fields of the first layer may be quantized to a full picture sample accuracy on the basis of the layers being of different type or an indication by the encoder in the bitstream.

Maximum (absolute) horizontal and/or vertical motion vector length.

Maximum reference index.

Maximum POC difference between a picture to which the motion field corresponds and any used reference picture in the motion field.

In some embodiments, it may be specified for example in a coding standard how one or more of the above-mentioned or any other motion field related parameter or parameter value or parameter constraints affects the memory use for a motion field. Such memory use may be considered in constraints specified for example for levels in a coding standard and/or may affect the maximum number or motion field storage buffers. Such memory use may be nominal and an encoder and/or a decoder implementation may actually use another allocation of memory for different parameters. For example, the memory use for a single motion vector component may be specified to be in bits log 2(2*maximum absolute motion vector length/motion vector accuracy), where motion vector accuracy is e.g. ¼ for quarter-pixel motion vector accuracy, ½ for half-pixel motion vector accuracy, and so on. For example, if maximum absolute motion vector length is 511 and motion vector accuracy is ¼, 12 bits are needed to store the motion vector component. The memory use for motion information for a single block may be rounded up for example to full bytes in order to provide easier memory access.

Figure 1:
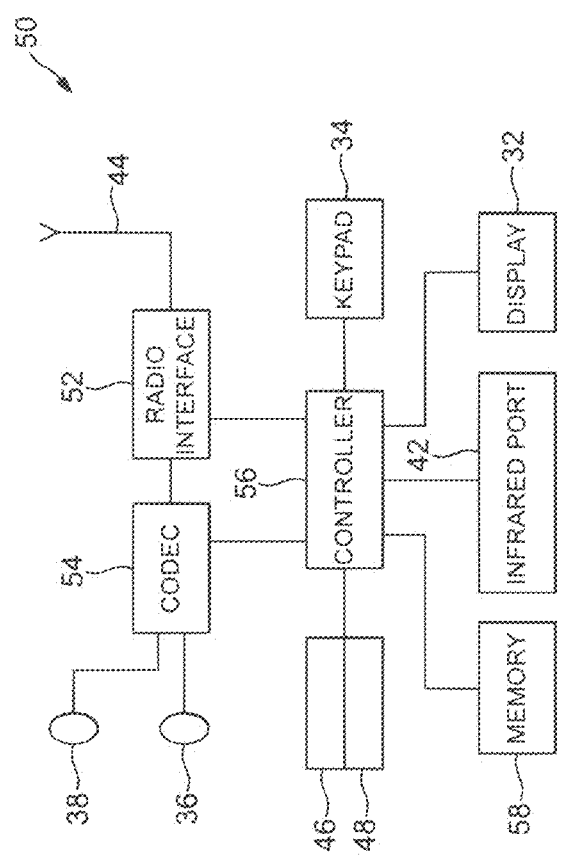
FIG. 1 shows a block diagram of a video coding system according to an embodiment.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
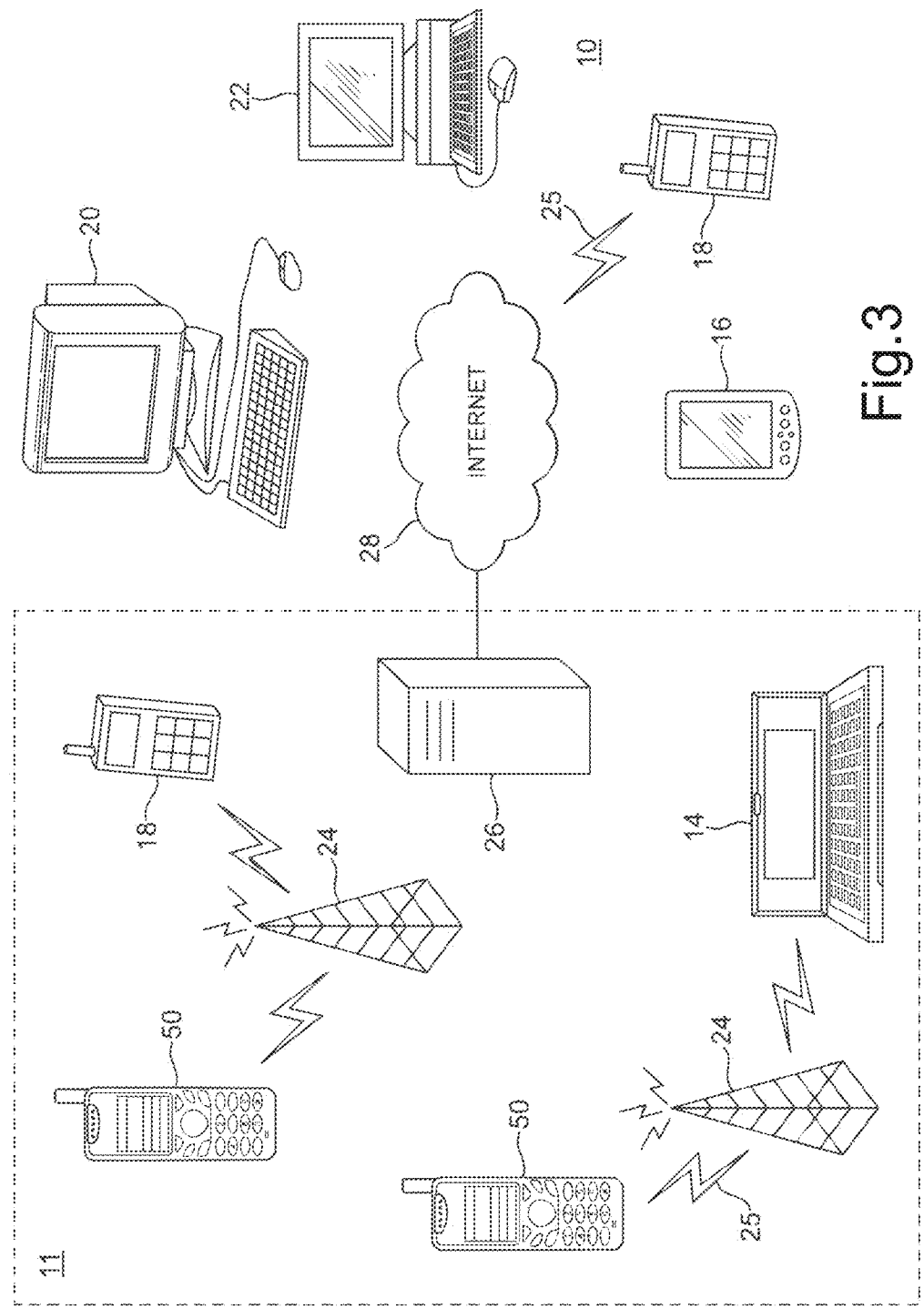
FIG. 3 shows an arrangement for video coding comprising a plurality of apparatuses.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In the above, the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

In the above, the example embodiments have been described with the help of syntax of the bitstream. It needs to be understood, however, that the corresponding structure and/or computer program may reside at the encoder for generating the bitstream and/or at the decoder for decoding the bitstream.

In the above, some embodiments have been described in relation to particular types of parameter sets. It needs to be understood, however, that embodiments could be realized with any type of parameter set or other syntax structure in the bitstream.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices. For example, in some embodiments, an indication according to any embodiment above may be coded into a video parameter set or a sequence parameter set, which is conveyed externally from a coded video sequence for example using a control protocol, such as SDP. Continuing the same example, a receiver may obtain the video parameter set or the sequence parameter set, for example using the control protocol, and provide the video parameter set or the sequence parameter set for decoding.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Figure 4:
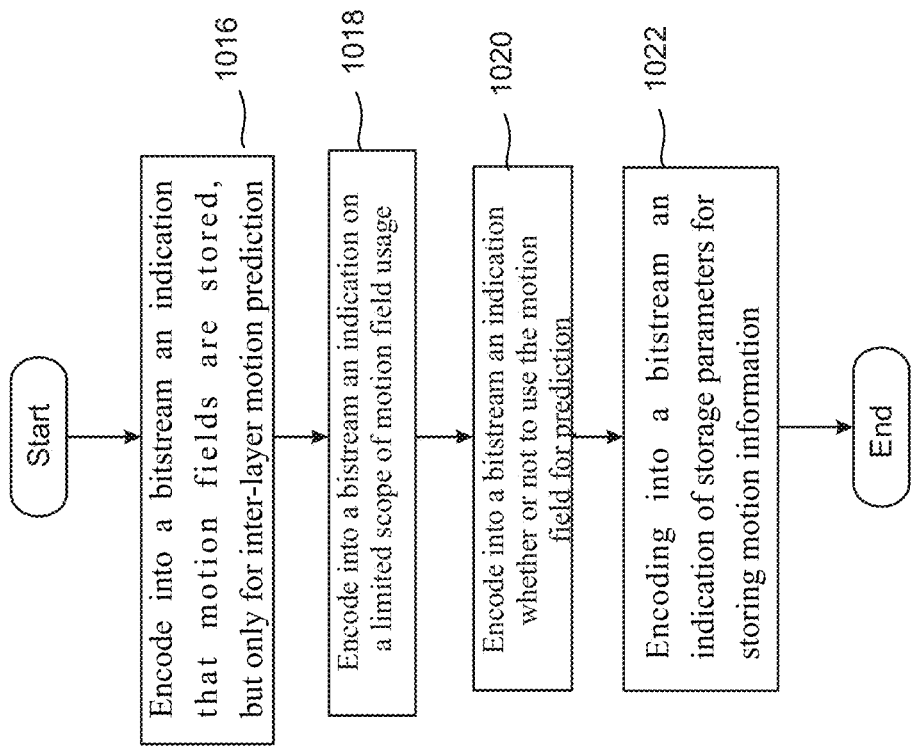
FIG. 4 shows a high level flow chart of a method according to an embodiment.

FIG. 4 illustrates a flowchart of an encoding method according to an embodiment. The embodiment comprises steps for encoding into a bitstream an indication that motion fields are stored, but only for inter-layer motion prediction (1016); encoding into a bitstream an indication on a limited scope of motion field usage (1018); encoding into a bitstream an indication whether or not to use the motion field for prediction (1020); encoding into a bitstream an indication of storage parameters for storing motion information (1022). One or more of the previous steps can be performed.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

According to an example, there is provided a method comprising at least one of the following:
a) encoding into a bitstream an indication that motion fields are stored, but only for inter-layer motion prediction;
b) encoding into a bitstream an indication on a limited scope of motion field usage;
c) encoding into a bitstream an indication whether or not to use the motion field for prediction;
d) encoding into a bitstream an indication of storage parameters for storing motion information.

According to a first embodiment, a step a) comprises two or more of the following:
  i. encoding into a bitstream an indication whether or not motion fields are used within a layer for temporal motion vector prediction;
  ii. encoding into a bitstream an indication whether or not inter-layer motion prediction is allowed to be used;
  iii. encoding into a bitstream an indication whether or not diagonal motion prediction is allowed to be used.

According to a second embodiment, in step b) the limited scope defines either certain temporal sub-layers or picture types or both.

According to a third embodiment, step c) comprises using a specific algorithms for inferring motion fields to be used for prediction.

According to a fourth embodiment, step c) comprises encoding in the bitstream a command or a syntax element for controlling motion field marking.

According to a fifth embodiment, step d) comprises indicating either spatial resolution or accuracy of storing motion information.

According to a sixth embodiment, step d) comprises indicating which parameters of the motion information are needed in the motion prediction.

According to a seventh embodiments, step d) comprises indicating constraints on parameter of the motion information which reduces the storage space for motion fields.

According to a second example, there is provided an apparatus comprising at least one processor and at least one memory including computer program code, the at least one memory and the computer program code configured to, with the at least one processor, cause the apparatus to perform at least one of the following:

a) encode into a bitstream an indication that motion fields are stored, but only for inter-layer motion prediction;
b) encode into a bitstream an indication on a limited scope of motion field usage;
c) encode into a bitstream an indication whether or not to use the motion field for prediction;
d) encode into a bitstream an indication of storage parameters for storing motion information.

According to a third example there is provided a computer program product including one or more sequences of one or more instructions which, when executed by one or more processors, cause an apparatus to at least perform at least one of the following:
a) encoding into a bitstream an indication that motion fields are stored, but only for inter-layer motion prediction;
b) encoding into a bitstream an indication on a limited scope of motion field usage;
c) encoding into a bitstream an indication whether or not to use the motion field for prediction;
d) encoding into a bitstream an indication of storage parameters for storing motion information.

According to a fourth example, there is provided a method comprising at least one of the following:
a) decoding from a bitstream an indication that motion fields are stored, but only for inter-layer motion prediction;
b) decoding from a bitstream an indication on a limited scope of motion field usage;
c) decoding from a bitstream an indication whether or not to use the motion field for prediction;
d) decoding from a bitstream an indication of storage parameters for storing motion information.

According to a fifth example, there is provided an apparatus comprising at least one processor and at least one memory including computer program code, the at least one memory and the computer program code configured to, with the at least one processor, cause the apparatus to perform at least one of the following:
a) decode from a bitstream an indication that motion fields are stored, but only for inter-layer motion prediction;
b) decode from a bitstream an indication on a limited scope of motion field usage;
c) decode from a bitstream an indication whether or not to use the motion field for prediction;
d) decode from a bitstream an indication of storage parameters for storing motion information.

According to a sixth example there is provided a computer program product including one or more sequences of one or more instructions which, when executed by one or more processors, cause an apparatus to at least perform at least one of the following:
a) decoding from a bitstream an indication that motion fields are stored, but only for inter-layer motion prediction;
b) decoding from a bitstream an indication on a limited scope of motion field usage;
c) decoding from a bitstream an indication whether or not to use the motion field for prediction;
d) decoding from a bitstream an indication of storage parameters for storing motion information.

The invention claimed is:

1. A method comprising at least the following:
encoding into a bitstream an indication indicating whether motion fields including motion information for each of a plurality of blocks of one or more pictures of a layer are stored,
wherein the encoding comprises:
encoding into a bitstream an indication whether or not motion fields are used within a layer for temporal motion vector prediction of another picture; and
encoding into a bitstream an indication whether or not inter-layer motion prediction is allowed to be used,
wherein inter-layer prediction provides for a prediction between different layers of a same time instant,
wherein the indications encoded into the bitstream indicate that the motion fields of the layer are used only for inter-layer motion prediction of a respective block and not for temporal motion vector prediction of the same respective block of another picture, and
in an instance in which temporal motion vector prediction is not used within the layer for temporal motion vector prediction of another picture, storing the motion fields of the layer in an instance in which the motion fields are used for inter-layer motion prediction for another layer unless the another layer is not present in the bitstream or is not intended to be decoded in which case the motion fields of the layer are not stored.

2. A method according to claim 1, wherein the indication is specified in a sequence parameter set.

3. A method according to claim 1, wherein storing the motion fields comprises storing motion fields as part of an encoding a current picture at a certain layer.

4. A method according to claim 1, further comprising deriving a candidate list based upon an occupancy threshold of the candidate list, wherein the candidate list is constructed from a spatial candidate, a temporal candidate, or a combined bi-predictive candidate.

5. An apparatus comprising at least one processor and at least one memory including computer program code, the at least one memory and the computer program code configured to, with the at least one processor, cause the apparatus to perform at least the following:
encode into a bitstream an indication indicating whether motion fields including motion information for each of a plurality of blocks of one or more pictures of a layer are stored,
wherein the apparatus is caused to encode into the bitstream the indication by being configured to perform:
encoding into a bitstream an indication whether or not motion fields are used within a layer for temporal motion vector prediction of another picture; and
encoding into a bitstream an indication whether or not inter-layer motion prediction is allowed to be used,
wherein inter-layer prediction provides for a prediction between different layers of a same time instant,
wherein the indications encoded into the bitstream indicate that the motion fields of the layer are used only for inter-layer motion prediction of a respective block and not for temporal motion vector prediction of the same respective block of another picture,
and wherein the apparatus is further caused, in an instance in which temporal motion vector prediction is not used within the layer for temporal motion vector prediction of another picture, to store the motion fields of the layer in an instance in which the motion fields are used for inter-layer motion prediction for another layer unless the another layer is not present in the bitstream or is not intended to be decoded in which case the motion fields of the layer are not stored.

6. An apparatus according to claim 5, being further configured to specify the indication in a sequence parameter set.

7. An apparatus according to claim 5, wherein the apparatus being configured to store the motion fields of the layer comprises being configured to store motion fields as part of an encoding a current picture at a certain layer.

8. An apparatus according to claim 5 being a mobile device.

9. An apparatus according to claim 5, wherein the apparatus is further caused to derive a candidate list based upon an occupancy threshold of the candidate list, wherein the candidate list is constructed from a spatial candidate, a temporal candidate, or a combined bi-predictive candidate.

10. An encoder comprising at least one processor and at least one memory including computer program code, the at least one memory and the computer program code configured to, with the at least one processor, cause the encoder to perform at least the following:
    encode an indication into a bitstream for a decoder, said indication indicating whether motion fields including motion information for each of a plurality of blocks of one or more pictures of a layer are stored,
    wherein the encoder is caused to encode into the bitstream the indication by being configured to perform:
    encoding into a bitstream an indication whether or not motion fields are used within a layer for temporal motion vector prediction of another picture; and
    encoding into a bitstream an indication whether or not inter-layer motion prediction is allowed to be used,
    wherein inter-layer prediction provides for a prediction between different layers of a same time instant,
    wherein the indications encoded into the bitstream indicate that the motion fields of the layer are used only for inter-layer motion prediction of a respective block and not for temporal motion vector prediction of the same respective block of another picture,
    and wherein the encoder is further caused, in an instance in which temporal motion vector prediction is not used within the layer for temporal motion vector prediction of another picture, to store the motion fields of the layer in an instance in which the motion fields are used for inter-layer motion prediction for another layer unless the another layer is not present in the bitstream or is not intended to be decoded in which case the motion fields of the layer are not stored.

11. An encoder according to claim 10, wherein the encoder is further caused to derive a candidate list based upon an occupancy threshold of the candidate list, wherein the candidate list is constructed from a spatial candidate, a temporal candidate, or a combined bi-predictive candidate.

12. A computer program product comprising at least one non-transitory computer-readable storage medium including one or more sequences of one or more instructions which, when executed by one or more processors, cause an apparatus to at least perform at least the following:
    encoding an indication into a bitstream for a decoder, said indication indicating whether motion fields including motion information for each of a plurality of blocks of one or more pictures of a layer are stored,
    wherein the apparatus is caused to encode into the bitstream the indication by being configured to perform:
    encoding into a bitstream an indication whether or not motion fields are used within a layer for temporal motion vector prediction of another picture; and
    encoding into a bitstream an indication whether or not inter-layer motion prediction is allowed to be used,
    wherein inter-layer prediction provides for a prediction between different layers of a same time instant,
    wherein the indications encoded into the bitstream indicate that the motion fields of the layer are used only for inter-layer motion prediction of a respective block and not for temporal motion vector prediction of the same respective block of another picture,
    and wherein the one or more sequences of one or more instructions, when executed by one or more processors, cause the apparatus, in an instance in which temporal motion vector prediction is not used within the layer for temporal motion vector prediction of another picture, to store the motion fields of the layer in an instance in which the motion fields are used for inter-layer motion prediction for another layer unless the another layer is not present in the bitstream or is not intended to be decoded in which case the motion fields of the layer are not stored.

13. A computer program product according to claim 12, wherein the one or more sequences of one or more instructions, when executed by one or more processors, cause the apparatus to derive a candidate list based upon an occupancy threshold of the candidate list, wherein the candidate list is constructed from a spatial candidate, a temporal candidate, or a combined bi-predictive candidate.

14. A method comprising at least the following:
    decoding an indication from a bitstream, said indication indicating whether motion fields including motion information for each of a plurality of blocks of one or more pictures of a layer are stored,
    wherein the decoding comprises:
    decoding from a bitstream an indication whether or not motion fields are used within a layer for temporal motion vector prediction of another picture; and
    decoding from a bitstream an indication whether or not inter-layer motion prediction is allowed to be used,
    wherein inter-layer prediction provides for a prediction between different layers of a same time instant,
    and in an instance in which the indications decoded from the bitstream indicate that the motion fields of the layer are used only for inter-layer motion prediction of a respective block and not for temporal motion vector prediction of the same respective block of another picture, deallocating memory used to store the motion fields of the layer once all inter-layer prediction has been completed.

15. A method according to claim 14, further comprising deriving a candidate list based upon an occupancy threshold of the candidate list, wherein the candidate list is constructed from a spatial candidate, a temporal candidate, or a combined bi-predictive candidate.

16. An apparatus comprising at least one processor and at least one memory including computer program code, the at least one memory and the computer program code configured to, with the at least one processor, cause the apparatus to perform at least the following:
    decoding an indication from a bitstream, said indication indicating whether motion fields including motion information for each of a plurality of blocks of one or more pictures of a layer are stored,
    wherein the apparatus is caused to decode from the bitstream the indication by being configured to perform:
    decoding from a bitstream an indication whether or not motion fields are used within a layer for temporal motion vector prediction of another picture; and
    decoding from a bitstream an indication whether or not inter-layer motion prediction is allowed to be used, wherein inter-layer prediction provides for a prediction between different layers of a same time instant, and wherein the apparatus is further caused, in an instance in which the indications decoded from the bitstream indicate that the motion fields of the layer are used only for inter-layer motion prediction of a respective block and not for temporal motion vector prediction of the same respective block of another picture, to deallocate memory used to store the motion fields of the layer once all inter-layer prediction has been completed.

17. An apparatus according to claim 16, wherein the apparatus is further caused to derive a candidate list based upon an occupancy threshold of the candidate list, wherein the candidate list is constructed from a spatial candidate, a temporal candidate, or a combined bi-predictive candidate.

18. A computer program product comprising at least one non-transitory computer-readable storage medium including one or more sequences of one or more instructions which, when executed by one or more processors, cause an apparatus to at least perform at least the following:

decoding an indication from a bitstream, said indication indicating whether motion fields including motion information for each of a plurality of blocks of one or more pictures of a layer are stored, wherein the apparatus is caused to decode from the bitstream the indication by being configured to perform:

decoding from a bitstream an indication whether or not motion fields are used within a layer for temporal motion vector prediction of another picture; and decoding from a bitstream an indication whether or not inter-layer motion prediction is allowed to be used, wherein inter-layer prediction provides for a prediction between different layers of a same time instant, and wherein the one or more sequences of one or more instructions, when executed by one or more processors, cause the apparatus, in an instance in which the indications decoded from the bitstream indicate that the motion fields of the layer are used only for inter-layer motion prediction of a respective block and not for temporal motion vector prediction of the same respective block of another picture, to deallocate memory used to store the motion fields of the layer once all inter-layer prediction has been completed.

19. A computer program product according to claim 18, wherein the one or more sequences of one or more instructions, when executed by one or more processors, cause the apparatus to derive a candidate list based upon an occupancy threshold of the candidate list, wherein the candidate list is constructed from a spatial candidate, a temporal candidate, or a combined bi-predictive candidate.

* * * * *